United States Patent
Nelson et al.

(10) Patent No.: US 10,807,000 B2
(45) Date of Patent: Oct. 20, 2020

(54) CONCURRENT GAMING WITH GAZE DETECTION

(71) Applicant: IGT, Las Vegas, NV (US)

(72) Inventors: Dwayne Nelson, Las Vegas, NV (US); Derrick Price, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 15/677,133

(22) Filed: Aug. 15, 2017

(65) Prior Publication Data

US 2019/0054377 A1 Feb. 21, 2019

(51) Int. Cl.
- *A63F 13/52* (2014.01)
- *G07F 17/32* (2006.01)
- *G06F 3/01* (2006.01)
- *A63F 13/213* (2014.01)

(52) U.S. Cl.
CPC ............ *A63F 13/52* (2014.09); *A63F 13/213* (2014.09); *G06F 3/013* (2013.01); *G07F 17/3211* (2013.01); *G07F 17/3225* (2013.01); *G07F 17/3246* (2013.01); *G07F 17/3248* (2013.01); *G07F 17/3251* (2013.01)

(58) Field of Classification Search
CPC ....................................................... G07F 17/32
See application file for complete search history.

(56) References Cited

U.S. PATENT DOCUMENTS

| | | | |
|---|---|---|---|
| 6,222,465 B1 | 4/2001 | Kumar et al. | |
| 7,815,507 B2 | 10/2010 | Parrott et al. | |
| 8,643,680 B2 | 2/2014 | Baldwin et al. | |
| 9,244,527 B2 | 1/2016 | Lathrop et al. | |
| 9,308,439 B2 | 4/2016 | Aoki et al. | |
| 2004/0215774 A1* | 10/2004 | Birkestrand | G06F 9/5011 709/225 |
| 2006/0160614 A1* | 7/2006 | Walker | G07F 17/32 463/29 |
| 2009/0093300 A1* | 4/2009 | Lutnick | G07F 17/32 463/26 |
| 2011/0304606 A1 | 12/2011 | Walsh | |
| 2012/0105486 A1 | 5/2012 | Lankford et al. | |
| 2012/0288139 A1* | 11/2012 | Singhar | G06F 1/3265 382/103 |
| 2012/0322542 A1 | 12/2012 | Chudd et al. | |
| 2014/0323194 A1 | 10/2014 | Keilwert | |
| 2015/0169053 A1 | 6/2015 | Bozarth et al. | |
| 2016/0093136 A1 | 3/2016 | Lyons et al. | |
| 2016/0252957 A1 | 9/2016 | Raux | |
| 2017/0046906 A1* | 2/2017 | Hilbert | G07F 17/3209 |
| 2017/0169662 A1 | 6/2017 | Froy et al. | |

* cited by examiner

*Primary Examiner* — Kevin Y Kim

(74) *Attorney, Agent, or Firm* — Sage Patent Group

(57) ABSTRACT

A method of operating an electronic gaming machine (EGM) includes concurrently operating a plurality of different wagering games on the EGM in a plurality of game windows, detecting a gaze direction of a player, determining one of the concurrently displayed wagering games that the player is watching in response to the detected gaze direction of the player, and modifying a manner in which the one of the concurrently displayed wagering games is operated relative to others of the concurrently displayed wagering games.

23 Claims, 17 Drawing Sheets

CONCURRENT GAMING WITH GAZE DETECTION

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD

Embodiments described herein relate to the field of electronic gaming machines, and in particular to electronic gaming machines that track a player's eye gaze.

BACKGROUND

In casinos and other establishments, players may play wagering games using electronic gaming machines (EGMs), such as video gaming terminals. EGMs may include other types of systems, such as online gaming systems that enable users to play games using computer devices, such as desktop computers, laptops, tablet computers or smart phones, computer programs for use on a computer device, gaming consoles that are connectable to a display, such as a television or computer screen, and others.

EGMs may be configured to enable users to play games with a touch interface. Example games may be a slot machine game, which may involve a reel of symbols that may move by pulling a lever or pushing a button to activate the reel of symbols. A user may win a prize based on the symbols displayed on the reel. In addition to slot machine-style games, EGMs may be configured to enable users to play a variety of different types of games. For example, some EGMs are configured to provide a tile-matching game, a video poker game, a wheel of fortune game, or other style of game. To interact with a game component of the game, the user may have to press a button that is part of the machine hardware, or the user may have to touch a button displayed on a display screen.

To provide a more immersive and attractive gaming experience, EGM manufacturers have recently been increasing the size of video display screens, and in some cases incorporating three-dimensional display screens, in EGMs. Meanwhile, manufacturers have also been increasing the complexity of content that is displayed on EGMs as players demand more and more complex and visually stimulating content from wagering games. These trends have placed increasing burdens on the hardware of the EGM, causing manufacturers to build EGMs with faster microprocessors, more memory, and/or more powerful graphics processors in each new product cycle, each of which may increase the cost of the EGM.

SUMMARY

A method of operating an electronic gaming machine according to some embodiments includes concurrently operating a plurality of different wagering games on the electronic gaming machine, wherein concurrently operating the plurality of different wagering games on the electronic gaming machine may include concurrently displaying a plurality of game windows associated with the plurality of different wagering games on an electronic display screen of the electronic gaming machine; detecting a gaze direction of a player; determining one of the concurrently displayed wagering games that the player is watching in response to the detected gaze direction of the player; and responsive to determining which one of the concurrently displayed wagering games the player is watching, modifying a manner in which the one of the concurrently displayed wagering games is operated relative to others of the concurrently displayed wagering games.

Modifying the manner in which the one of the concurrently displayed wagering games is operated relative to others of the concurrently displayed wagering games may include allocating more processing resources to the one of the concurrently displayed wagering games relative to others of the concurrently displayed wagering games.

Allocating more processing resources to the one of the concurrently displayed wagering games relative to others of the concurrently displayed wagering games may include assigning more processor cores, processor threads and/or processor time to the one of the concurrently displayed wagering games relative to others of the concurrently displayed wagering games.

Allocating more processing resources to the one of the concurrently displayed wagering games relative to others of the concurrently displayed wagering games may include increasing a video display setting relative to others of the concurrently displayed wagering games.

The video display setting may include a video resolution, an animation rate, an antialiasing setting, a shader setting, a polygon count, a mesh animation setting, an animation frequency, a shadow setting, a lighting setting, a frame rate, a bit rate, and/or a quality setting.

Modifying the manner in which the one of the concurrently displayed wagering games is operated relative to others of the concurrently displayed wagering games may include changing a property of the game window on the electronic display associated with the one of the concurrently displayed wagering games.

Changing the property of the game window on the electronic display associated with the one of the concurrently displayed wagering games may include increasing a size of the game window on the electronic display associated with the one of the concurrently displayed wagering games relative to game windows associated with others of the concurrently displayed wagering games.

Changing the property of the game window on the electronic display associated with the one of the concurrently displayed wagering games may include increasing a size of the game window on the electronic display associated with the one of the concurrently displayed wagering games and decreasing sizes of game windows associated with others of the concurrently displayed wagering games.

Changing the property of the game window on the electronic display associated with the one of the concurrently displayed wagering games may include increasing a color depth, color gamut, intensity, and/or contrast of images on the game window on the electronic display associated with the one of the concurrently displayed wagering games relative to images on game windows associated with others of the concurrently displayed wagering games.

Allocating more processing resources to the one of the concurrently displayed wagering games relative to others of the concurrently displayed wagering games may include allocating more resources of a graphics processor in the electronic gaming machine to the one of the concurrently displayed wagering games relative to others of the concurrently displayed wagering games.

Modifying the manner in which the one of the concurrently displayed wagering games is operated relative to others of the concurrently displayed wagering games may include disabling movie playback on the others of the concurrently displayed wagering games.

Modifying the manner in which the one of the concurrently displayed wagering games is operated relative to others of the concurrently displayed wagering games may include changing an audio property of the one of the concurrently displayed wagering games relative to audio properties of the others of the concurrently displayed wagering games.

Changing the audio property of the one of the concurrently displayed wagering games relative to audio properties of the concurrently displayed wagering games may include increasing a volume level of the one of the concurrently displayed wagering games relative to volume levels of the others of the concurrently displayed wagering games.

Increasing the volume level of the one of the concurrently displayed wagering games relative to volume levels of others of the concurrently displayed wagering games may include reducing volume levels of the others of the concurrently displayed wagering games.

Changing the audio property of the one of the concurrently displayed wagering games relative to audio properties of the others of the concurrently displayed wagering games may include disabling predetermined types of sounds in the others of the concurrently displayed wagering games.

The predetermined types of sounds in the others of the concurrently displayed wagering games may include voiceovers.

Disabling predetermined types of sounds in the others of the concurrently displayed wagering games may include assigning priority levels to the predetermined types of sounds and disabling selected ones of the predetermined types of sounds that have a priority level less than a threshold priority level.

The threshold priority level may be determined based on an audio property of the one of the concurrently displayed wagering games.

A method of operating an electronic gaming machine according to some embodiments includes concurrently operating a plurality of different wagering games on the electronic gaming machine, wherein concurrently operating the plurality of different wagering games on the electronic gaming machine may include concurrently displaying a plurality of game windows associated with the plurality of different wagering games on an electronic display screen of the electronic gaming machine; detecting a gaze direction of a player; and determining one of the concurrently displayed wagering games that the player is watching in response to the detected gaze direction of the player. Each the plurality of wagering games may include a number of sound events, upon the occurrence of which the wagering game plays an associated sound, and each of the sound events has an associated sound priority level. Responsive to two sound events in different ones of the wagering games overlapping in time, the sound event having a smallest sound priority level may be at least partially muted. The method further includes, responsive to determining which one of the concurrently displayed wagering games the player is watching, applying a weighting factor to sound priority levels of the predetermined types of sounds of the one of the concurrently displayed wagering games the player is watching.

The method may further include foregoing playing of the sound event having the smallest sound priority level.

A method of operating an electronic gaming machine according to further embodiments includes concurrently operating a plurality of different wagering games on the electronic gaming machine, wherein concurrently operating the plurality of different wagering games on the electronic gaming machine may include concurrently displaying a plurality of game windows associated with the plurality of different wagering games on an electronic display screen of the electronic gaming machine; detecting a gaze direction of a player; detecting occurrence of a game event in one of the plurality of wagering games, wherein the game event has an associated sound event; determining if the player is looking at the game window associated with the one of the plurality of wagering games for which the game event occurred; and playing a sound associated with the sound event responsive to determining that the player is looking at the game window associated with the one of the plurality of wagering games for which the game event occurred.

A method of operating an electronic gaming machine according to further embodiments includes concurrently operating a plurality of different wagering games on the electronic gaming machine, wherein concurrently operating the plurality of different wagering games on the electronic gaming machine may include concurrently displaying a plurality of game windows associated with the plurality of different wagering games on an electronic display screen of the electronic gaming machine; detecting a gaze direction of a player; detecting occurrence of a game event in one of the plurality of wagering games, wherein the game event has an associated lighting effect; determining if the player is looking at the game window associated with the one of the plurality of wagering games for which the game event occurred; and activating the lighting effect responsive to determining that the player is looking at the game window associated with the one of the plurality of wagering games for which the game event occurred.

A method of operating an electronic gaming machine according to further embodiments includes operating a wagering game on the electronic gaming machine, wherein operating the wagering game on the electronic gaming machine may include displaying a game window associated with the wagering game on an electronic display screen of the electronic gaming machine, wherein the game window has a plurality of window regions; detecting a gaze direction of a player; determining one of the window regions that the player is watching in response to the detected gaze direction of the player; and responsive to determining which one of the window regions the player is watching, modifying a manner in which the one of the window regions is rendered relative to others of the window regions.

DETAILED DESCRIPTION OF EMBODIMENTS

Figure 1A:
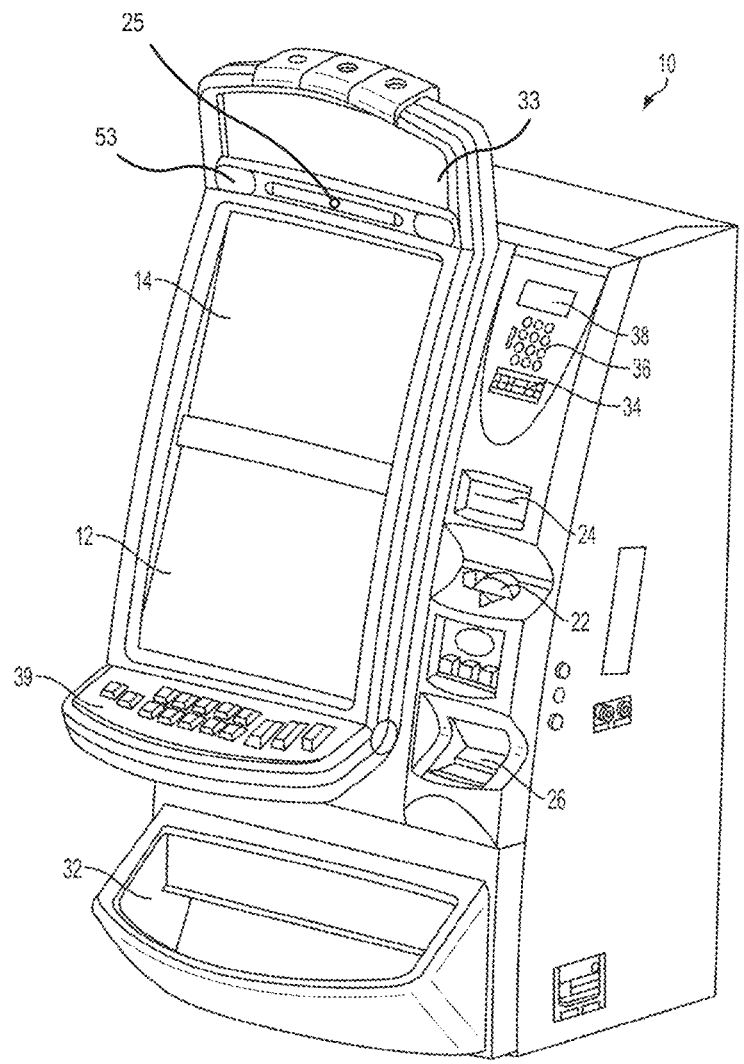
FIG. 1A is a perspective view of an electronic gaming machine according to some embodiments.

Embodiments described herein relate to enhanced electronic gaming machines (EGMs) that are capable of displaying multiple concurrent games simultaneously and that are capable of tracking the eye gaze of the player. In an EGM according to some embodiments, the operation of the EGM, and in particular the operation of the EGM to operate and/or display at least one of the concurrently displayed games, may be controlled in response to the player's eye gaze. In particular, in some embodiments, an aspect of one of the concurrently displayed games may be controlled based on whether the EGM determines that the player is looking, or is not looking, at the one of the concurrently displayed games. The aspect of the concurrently displayed game that is controlled by the EGM may include, by way of example but not limitation, an amount of computer resources utilized by the game, an image or video displayed as part of the game, a game component of the game, or a sound generated in connection with the game.

The EGM may include at least one data capture camera device that is configured to monitor the eye gaze of the player to collect player eye gaze data. Such monitoring may be performed continuously or selectively when eye gaze data is needed. The graphics processor of the EGM may be configured to generate a plurality of interactive game environments using the game data of a plurality of interactive games. The display device of the EGM may display a viewing area for each of the plurality of interactive games, which may form a portion of the interactive game environment for each game.

The EGM may be configured with algorithms to process recorded image data to detect in real-time the position of the player's eyes in three-dimensional (3D) space and the focus of the player's gaze in two dimensional-space (2D) or 3D space. The position of the player's eyes may be the physical location of the player's eyes in 3D space. The focus of the player's gaze may be the focus of the gaze on a display device of the EGM.

The EGM may have a game controller that can determine the location of the eye gaze of the player relative to the viewing area by mapping the location of the player eye gaze on the display device to the viewing area. The player eye gaze data can be analyzed to determine which of the concurrently displayed games the player is looking at. The game controller may trigger a control command to the display controller of the EGM to dynamically update the rendering of the viewing area of one or more of the concurrently displayed games based on the player eye gaze data. For example, in response to the control command, the display controller may control the display device in real-time or near real-time using the graphics processor to dynamically update the rendering of the viewing area to provide a real-time or near real-time graphical animation effect displayed on the display device to update the visible game components in the viewing area based on the player eye gaze data.

In some embodiments, in response to determining that the player is looking at one of the concurrently displayed games, the EGM may be configured to increase an amount of computer processing resources allocated to the one of the concurrently displayed games that the player is looking at, or to decrease an amount of computer processing resources allocated to one of the concurrently displayed games that the player is not looking at, or both. The computing resources may include, for example, a priority level of the game, a number of processors allocated to the game, a number of cores allocated to the game, a CPU percentage allocated to the game, a number of computing threads allocated to the game, a level of graphics processing unit (GPU) processing memory or power allocated to the game, etc.

In some embodiments, in response to determining that the player is looking at one of the concurrently displayed games, the EGM may be configured to increase a volume of sound associated with the one of the concurrently displayed games that the player is looking at, or to decrease a volume of sound associated with one of the concurrently displayed games that the player is not looking at, or both. In some embodiments, sound events that occur in response to a triggering event within a game may be assigned a priority, and the sound event may only be played if the player is determined based on the eye gaze data collected by the EGM to be currently looking at the game or if the priority level of the sound event is above a threshold level. The threshold level may be a fixed value or may change based on a present state of one or more of the concurrently displayed games.

In some embodiments, in response to determining that the player is looking at one of the concurrently displayed games, the EGM may be configured to increase a video resolution associated with the one of the concurrently displayed games that the player is looking at, or to decrease a video resolution associated with one of the concurrently displayed games that the player is not looking at, or both. In some cases, certain types of video signals may be displayable only by the concurrently displayed game the player is looking at. For example, some games may include high resolution cutscene videos that can be played in response to triggering events in a game. In some embodiments, such a cutscene video may only be playable when a triggering event occurs in a given game if the player is determined based on the eye gaze data collected by the EGM to be currently looking at the game.

The gaming enhancements described herein may be carried out using a physical EGM that may be embodied in a variety of forms, machines and devices including, for example, portable devices, such as tablets and smart phones, that can access a gaming site or a portal (which may access a plurality of gaming sites) via the Internet or other communication path (e.g., a LAN or WAN), and so on. The EGM may be located in various venues, such as a casino or an arcade.

Figure 1B:
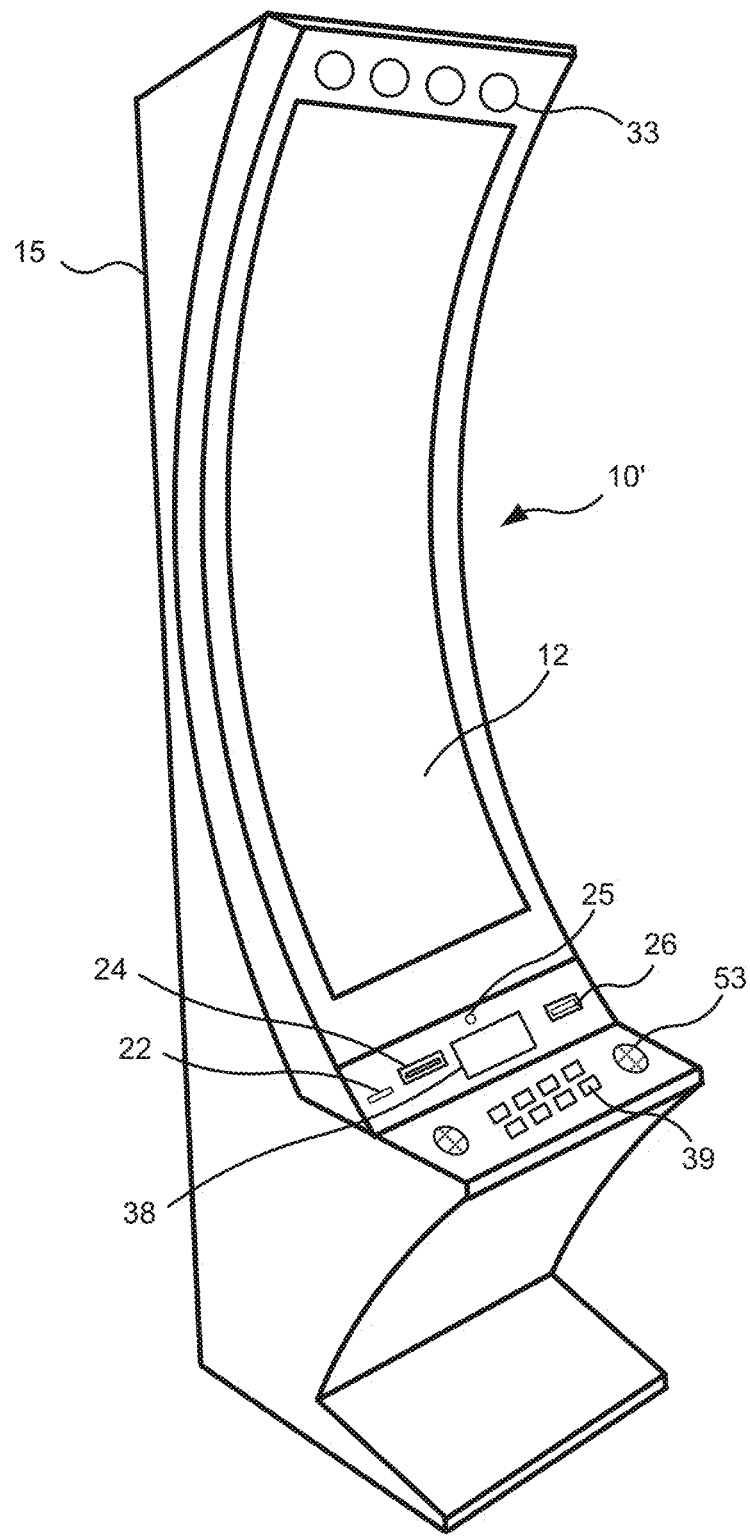
FIG. 1B is a perspective view of an electronic gaming machine according to further embodiments.

FIG. 1A is a perspective view of an EGM 10, and FIG. 1B is a perspective view of an EGM 10', that are configured to monitor eye gaze of a player to collect player eye gaze data, and to control operation of one of a plurality of concurrently displayed games in response to the player eye gaze data in accordance with some embodiments. A game controller may determine a location of the eye gaze of the player relative to a viewing area of the interactive game environment using the player eye gaze data and triggering a control command to control operation of at least one of the plurality of concurrently displayed games. In particular, a display controller in the EGM may dynamically update the rendering of the viewing area or a portion of the viewing area based on the player eye gaze data.

The EGM 10 has at least one data storage device to store game data for a plurality of interactive games. The data storage device may store game data for one or more primary interactive games and one or more bonus interactive games. The display controller may detect a control command from a game controller of the EGM and responsive to such command may dynamically update the rendering of the viewing area.

The example EGM 10 illustrated in FIG. 1A includes a display device 12 that may include a thin film transistor (TFT) display, a liquid crystal display (LCD), a cathode ray tube (CRT), auto stereoscopic 3D display and LED display, an OLED display, or any other type of display. An optional second display device 14 provides game data or other information in addition to display device 12. The display devices 12, 14, may have 2D display capabilities or 3D display capabilities, or both. The second display device 14 may provide static information, such as an advertisement for the game, the rules of the game, pay tables, pay lines, or other information, or may even display the main game or a bonus game along with display device 12. Alternatively, the area for display device 14 may be a display glass for conveying information about the game. Display device 12, 14 may also include a camera, sensor, and other hardware input devices. The display devices 12, 14 may display at least a portion of the visible game components of a plurality of interactive games. In particular, the display devices may simultaneously display a plurality of concurrently active interactive games.

The EGM 10 includes speakers 53 for playing audio associated with the games, which may include background music, sound effects, voiceovers, and other types of sounds. The sounds generated by the EGM 10 may be associated with one or more games playable on the EGM 10.

The EGM 10 further includes accent lights 33 that are separate from the display devices. Activation of the accent lights 33 may be coordinated with the game play of a game on the EGM 10. For example, when the player wins a prize, the accent lights may be activated and caused to flash different colors. The accent lights 33 may, for example, include RGB LEDs that can be programmed to flash or light up in different colors, patterns, brightnesses, etc. The accent lights 33 may be further synchronized with animations displayed on the display device 12, 14 and sounds played on the speakers 53.

In some embodiments, the display device 12, 14 may be a touch sensitive display device. The player may interact with the display device 12, 14 using touch control such as, but not limited to, touch, hold, swipe, and multi-touch controls. The player may use these interactions to manipulate the interactive game environment for easier viewing or preference, to manipulate game elements such as visible game components, or to select at least a portion of the visible game components depending on the design of the game. For example, the player may select one or more visible game components displayed by the display device 12, 14. As another example, the player may not have to touch the display device 12, 14 to play the interactive game. The player may instead interact with the interactive game using their eye gaze, eye gestures, and/or body movements.

The EGM 10 may include a data capture camera device 25 that is configured to continuously detect and monitor player interaction commands (e.g. eye gaze, eye gestures, player movement, touch, gestures) to interact with the viewing area and game components displayed on the display device 12, 14. Images from the data capture camera device 25 are transmitted to a game controller which determines a location of the eye gaze of the player(s) relative to the viewing area using the data provided by the data capture device 25. In some embodiments, a separate eye gaze tracking module including a data capture device and a processor may be provided. The processor of the eye gaze module may determine a location of the eye gaze of the player relative to the viewing area using the data provided by the data capture device, and the eye gaze tracking module may provide player eye gaze data to the game controller.

Eye gaze data may be captured for multiple players of an EGM 10. Accordingly, the player eye gaze data may include eye gaze data of multiple players. It will be appreciated that any reference herein to a player in the singular may include multiple players.

The data capture camera device 25 may include a single detector configured to capture images of the player or players of the EGM 10 from a single direction or multiple detectors configured to capture images of the player or players from multiple directions. The EGM 10 may be configured to detect the presence and location of multiple players.

In some embodiments, the game controller may trigger a control command to the display controller to dynamically update the rendering of the viewing area based on the player eye gaze data. In response to the control command, the display controller may control the display device in real-time or near real-time using the graphics processor to dynamically update the rendering of the viewing area to provide a real-time or near real-time graphical animation effect displayed on the display device that may represent a visual update to the visible game components in the viewing area, the visual update based on the player eye gaze data. In some embodiments, the control command may be based on the eye gaze, eye gesture, or the movement of the player, or any combination thereof. The eye gaze of the player may be the location on the display device where the player is looking. The eye gesture of the player may be the gesture made by the player using one or more eyes, such as widening the eyes, narrowing the eyes, blinking, and opening one eye and closing the other. The movement of the player may be the movement of the player's body, which may include head movement, hand movement, chest movement, leg movement, foot movement, or any combination thereof. A winning outcome of the game for provision of an award may be triggered based on the eye gaze, eye gesture, or the movement of the player. For example, by looking at a game component displayed by the display controller on the display device 12, 14 for a pre-determined period of time, the player may trigger a winning outcome. The award may include credits, free games, mega pot, small pot, progressive pot, and so on.

The display device 12, 14 may have a touch screen lamination that includes a transparent grid of conductors.

Touching the screen may change the capacitance between the conductors, and thereby the X-Y location of the touch may be determined. The X-Y location of the touch may be mapped to positions of interest to detect selection thereof, for example, the game components of the interactive game. A game processor of the EGM 10 associates this X-Y location with a function to be performed. Such touch screens may be used for slot machines, for example, or other types of gaming machines. There may be an upper and lower multi-touch screen in accordance with some embodiments. One or both of display device 12, 14 may be configured to have auto stereoscopic 3D functionality to provide 3D enhancements to the interactive game environment. The touch location positions may be 3D, for example, and mapped to at least one visible game component of the plurality of visible game components.

The EGM 10 may include a physical device for receiving and accepting value from a player, such as a coin, bill, token, printed ticket, magnetic card, or other token of value in return for which the player is granted credits on the EGM 10. For example, a coin acceptor 22 may have a coin slot that accepts coins or tokens in one or more denominations to generate credits within EGM 10 for playing games. A ticket acceptor 24 includes an input slot that receives machine readable printed tickets and outputs printed tickets for use in cashless gaming. A bill acceptor 26 receives and validates paper money deposited by the player.

A coin tray 32 may receive coins or tokens from a hopper upon a win or upon the player cashing out. However, the EGM 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

In some embodiments, the EGM 100 may include a scanner for scanning a barcode indicative of a cryptocurrency address, such as a bitcoin, litecoin or ethereum address, to permit the EGM 100 to transfer credits to a player in the form of a cryptocurrency.

A card reader 34 may read from various types of cards, such as smart cards, magnetic strip cards, or other types of cards conveying machine readable information. The card reader reads the inserted card for player and credit information for cashless gaming. Card reader slot 34 may read a magnetic code on a conventional player tracking card, where the code uniquely identifies the player to a host system at the venue. The code is cross-referenced by the host system to any data related to the player, and such data may affect the games offered to the player by the gaming terminal. The card reader 34 may also include an optical reader and printer for reading and printing coded barcodes and other information on a paper ticket. A card may also include credentials that enable the host system to access one or more accounts associated with a user. The account may be debited based on wagers by a user and credited based on a win.

The card reader 34 may be implemented in different ways for various embodiments. The card reader 34 may be an electronic reading device such as a player tracking card reader, a ticket reader, a banknote detector, a coin detector, or any other input device that can read an instrument supplied by the player for conveying a monetary amount. In the case of a tracking card, the card reader 34 detects the player's stored bank and applies that to the gaming machine being played. The card reader 34 or reading device may be an optical reader, a magnetic reader, or other type of reader. The card reader 34 may have a slot provided in the gaming machine for receiving the instrument. The card reader 34 may also have a communication interface (or control or connect to a communication interface) to digitally transfer tokens or indicia of credits or money via various methods such as RFID, tap, smart card, credit card, loyalty card, NFC and so on.

An electronic device may couple (by way of a wired or wireless connection) to the EGM 10 to transfer electronic data signals for player credits and the like. For example, near field communication (NFC) may be used to couple to EGM 10 which may be configured with NFC enabled hardware. This is a non-limiting example of a communication technique.

A keypad 36 may accept player input, such as a personal identification number (PIN) or any other player information. A display 38 above keypad 36 displays a menu for instructions and other information and provides visual feedback of the keys pressed.

The keypad 36 may be an input device such as a touchscreen, or dynamic digital button panel, in accordance with some embodiments.

The EGM 10 may include a plurality of player control buttons 39 that include any buttons or other controllers needed to play the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. The player control buttons 39 may in some embodiments be implemented as virtual buttons on a touch screen display.

The EGM 10 may also include a digital button panel 39. The digital button panel may include various elements such as for example, a touch display, animated buttons, frame lights, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on. The digital button panel may receive player interaction commands, in some example embodiments.

The EGM 10 may also include hardware configured to provide eye, motion or gesture tracking. For example, the EGM 10 may include at least one data capture camera device 25, which may be one or more cameras that detect one or more spectra of light, one or more sensors (e.g. optical sensor), or a combination thereof. The data capture camera device 25 may be used for eye, gesture or motion tracking of player, such as detecting eye movement, eye gestures, player positions and movements, and generating signals defining x, y and z coordinates. For example, the data capture camera device 25 may be used to implement tracking recognition techniques to collect player eye gaze data, player eye gesture data, and player movement data. An example type of motion tracking is optical motion tracking. The motion tracking may include a body and head controller. The motion tracking may also include an eye controller. The EGM 10 may implement eye-tracking recognition technology using cameras, sensors (e.g. optical sensor), data receivers and other electronic hardware to capture various forms of player input. The eye gaze, eye gesture, or motion by a player may interact with the interactive game environment or may impact the type of graphical animation effect. Accordingly, the EGM 10 may be configured to capture player eye gaze input, eye gesture input, and movement input as player interaction commands.

Embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

The data capture camera device 25 may capture player data, such as button input, gesture input and so on. The data capture camera device 25 may include a camera, a sensor or other data capture electronic hardware. In some embodiments, EGM 10 may include at least one data capture camera device that continuously monitors the eye gaze of a player to collect player eye gaze data. The player may provide input to the EGM 10 using the eye gaze of the player. For example, using the eye gaze of the player, which may be collected as player eye gaze data, the player may select an interactive game to play, interact with a game component, or trigger a bonus interactive game.

Embodiments described herein involve computing devices, servers, electronic gaming terminals, receivers, transmitters, processors, memory, display, and networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

As described herein, the EGM 10 may be configured to provide an interactive game environment that concurrently displays multiple games to a player. The interactive game environment may be a 2D or 3D interactive game environment. The interactive game environment may provide a plurality of game components or game symbols based on the game data. The game data may relate to a primary interactive game or a bonus interactive game, or both. For example, the interactive game environment may comprise a 3D reel space that may have an active primary game matrix of a primary subset of game components. The bonus subset of game components may be different from the primary subset of game components. The player may view a viewing area of the interactive game environment, which may be a subset of the interactive game environment, on the display device 12, 14. The interactive game environment or the viewing area may be dynamically updated based on the eye gaze, eye gesture, or movement of the player in real-time or near real-time. The update to the interactive game environment or the viewing area may be a graphical animation effect displayed on the display device 12, 14. The update to the interactive game environment or the viewing area may be triggered based on the eye gaze, eye gesture, or movement of the player. For example, the update may be triggered by looking at a particular part of the viewing area for a pre-determined period of time, or looking at different parts of the viewing area in a pre-determined sequence, or widening or narrowing the eyes. The interactive game environment may be updated dynamically and revealed by dynamic triggers from game content of the primary interactive game in response to electronic data signals collected and processed by EGM 10.

For an interactive game environment, the EGM 10 may include a display device 12, 14 with auto stereoscopic 3D functionality. The EGM 10 may include a touch screen display for receiving touch input data to define player interaction commands. The EGM 10 may also include at least one data capture camera device, for example, to further receive player input to define player interaction commands. The EGM 10 may also include several effects and frame lights. The 3D enhancements may be an interactive game environment for additional game symbols.

The EGM 10 may include an output device such as one or more speakers. The speakers may be located in various locations on the EGM 10 such as in a lower portion or upper portion. The EGM 10 may have a chair or seat portion and the speakers may be included in the seat portion to create a surround sound effect for the player. The seat portion may allow for easy upper body and head movement during play. Functions may be controllable via an on screen game menu. The EGM 10 is configurable to provide full control over all built-in functionality (lights, frame lights, sounds, and so on).

The EGM 10 may also include a plurality of effects lights and frame lights. The lights may be synchronized with enhancements of the game. The EGM 10 may be configured to control color and brightness of lights. Additional custom animations (color cycle, blinking, etc.) may also be configured by EGM 10. The custom animations may be triggered by certain gaming events.

In some embodiments, an EGM 10 may be implemented by a desktop computer, a laptop personal computer, a personal digital assistant (PDA), portable computing device, or other computerized platform. In some embodiments, the EGM 10 may be operable over a wireless network, such as part of a wireless gaming system. In such embodiments, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 1C:
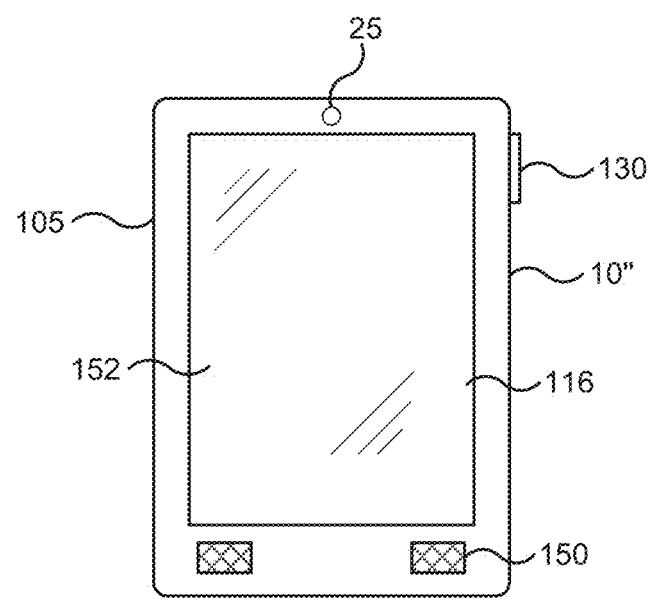
FIG. 1C is a perspective view of a handheld electronic gaming machine according to further embodiments.

For example, referring to FIG. 1C, an EGM 10″ may be implemented as a handheld device including a compact housing 105 on which is mounted a touchscreen display device 116 including a digitizer 152. An input button 130 may be provided on the housing and may act as a power or control button. A camera 25 may be provided in a front face of the housing 105. The housing 105 may include one or more speakers 150. In the EGM 10″, various input buttons described above, such as the cashout button, gameplay activation button, etc., may be implemented as soft buttons on the touchscreen display device 116. Moreover, the EGM 10″ may omit certain features, such as a bill acceptor, a ticket generator, a coin acceptor or dispenser, a card reader, secondary displays, a bet display, a credit display, etc. Credits can be deposited in or transferred from the EGM 10″ electronically.

Figure 2:
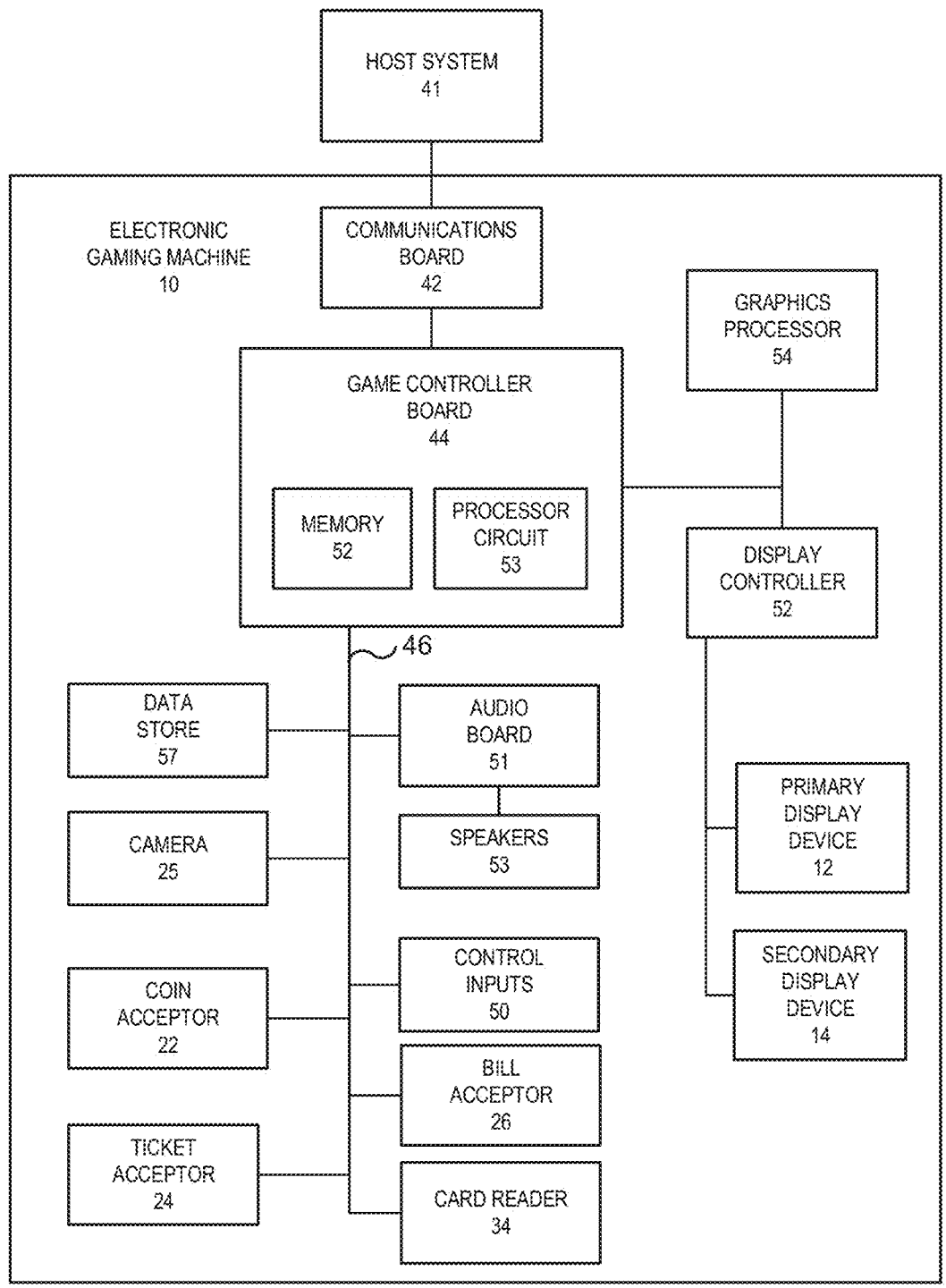
FIG. 2 is a schematic diagram of an electronic gaming machine linked to a casino host system according to some embodiments.

FIG. 2 is a block diagram of some components of EGM 10 according to some embodiments. The EGM 10 is shown linked to the casino's host system 41 via network infrastructure. These hardware components are particularly configured to provide at least one interactive game. These hardware components may be configured to provide at least one interactive game and at least one bonus game, and in some cases to provide a plurality of concurrently displayed interactive games.

A communications board 42 may contain circuitry for coupling the EGM 10 to network. The communications board 42 may include a network interface allowing EGM 10 to communicate with other components, to access and connect to network resources, to serve an application, to access other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these. The EGM 10 may communicate over a network using a suitable protocol, such as the G2S protocols.

The communications board 42 may communicate, transmit and receive data using a wireless transmitter, or it may be wired to a network, such as a local area network running throughout the casino floor, for example. The communications board 42 may set up a communication link with a master controller and may buffer data between the network and a game controller board 44. The communications board 42 may also communicate with a network server, such as in accordance with the G2S standard, for exchanging information to carry out embodiments described herein.

The game controller board 44 includes a memory 52 and a processor circuit 53 for carrying out program instructions stored in the memory and for providing the information requested by the network. Game data for one or more game programs may be stored in the memory 52. The processor circuit 53 may be a multi-core processor including two or more independent processing units. Each of the cores in the processor circuit 53 may support multi-threading operations, i.e., may have the capability to execute multiple processes or threads concurrently. Additionally, the processor circuit 53 may have an on-board memory cache. An example of a suitable multi-core, multithreaded processor circuit is an Intel® Core i7-7920HQ processor, which has four cores that support eight threads each and has an 8 MB on-board cache. The game controller board 44 executes game routines using game data stores in a data store 57 accessible to the game controller board 44, and cooperates with a graphics processor 54 and a display controller 52 to provide games with enhanced interactive game components. The graphics processor 54 may have an integrated high-speed dedicated graphics memory.

The EGM 10 may include at least one data capture camera device 25 for implementing the gaming enhancements, in accordance with some embodiments. The EGM 10 may include the data capture camera device 25, one or more sensors (e.g. optical sensor), or other hardware device configured to capture and collect in real-time or near real-time data relating to the eye gaze, eye gesture, or movement of the player(s), or any combination thereof.

In some embodiments, the data capture camera device 25 may be used for eye gaze tracking, eye gesture tracking, motion tracking, and movement recognition. The data capture camera device 25 may collect data defining x, y and z coordinates representing eye gaze, eye gestures, and movement of the player(s).

In some embodiments, the data capture camera device 25 may track a position of each eye of a player relative to display device 12, 14, as well as a direction of focus of the eyes and a point of focus on the display device 12, 14, in real-time or near real-time. The focus direction may be the direction at which the player's line of sight travels or extends from his or her eyes to display device 12, 14. The focus point may be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be examples of, and referred to as, player's eye movements or player movement data.

In some embodiments, the data capture camera device 25 may monitor the eye gaze, eye gesture, and/or movement of two or more people, who may be two or more players of the interactive game, to collect the player eye gaze data, player eye gesture data, and/or player movement data. The player eye gaze data, player eye gesture data, and/or player movement data may be used such that both players may be able to play the interactive game simultaneously. The interactive game may include aspects of both cooperative and competitive play.

As previously described, the data capture camera device 25 may track a position of a player's eyes relative to display device 12, 14, as well as a focus direction and a focus point on the display device 12, 14 of the player's eyes in real-time or near real-time. The focus direction can be the direction at which the player's line of sight travels or extends from his or her eyes to the display device 12, 14. The focus point may sometimes be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be instances of player movement data.

In addition, a focus point may extend to or encompass different visual fields visible to the player. For example, a foveal area may be a small area surrounding a fixation point on the display device 12, 14 directly connected by a (virtual) line of sight extending from the eyes of a player. This foveal area in the player's vision may generally appear to be in sharp focus and may include one or more game components and the surrounding area. A focus point may include the foveal area immediately adjacent to the fixation point directly connected by the (virtual) line of sight extending from the player's eyes.

The display controller 52 may control one or more of display device 12, 14 the using graphics processor 54 to display a viewing area that may include one or more visible game components based on the game data of a plurality of concurrently displayed interactive games.

The display controller 52 may, in response to detection of the control command from the game controller 44 based on the player eye gaze data, player eye gesture data, or player movement data, control display device 12, 14 using graphics processor 54. Display controller 52 may update the viewing area to trigger a graphical animation effect displayed on one or both of display device 12, 14 representative of a visual update to the visible game components in the viewing area, the visual update based on the player eye gaze data, player eye gesture data, or player movement data.

Peripheral devices/boards in the EGM 10 may communicate with the game controller board 44 via a bus 46 using, for example, an RS-232 interface. Such peripherals may include a bill acceptor 26, a coin acceptor 22, a smart card reader or other type of credit card reader 34, and player control inputs 50 (such as buttons or a touch screen).

The player control inputs 50 may include the keypad, the buttons, touchscreen display, gesture tracking hardware, and data capture device as described herein. Other peripherals may be one or more cameras used for collecting player input data, or other player movement or gesture data that may be used to trigger player interaction commands. The display device 12, 14 may be a touch sensitive display device. Player control input device 50 may be integrated with the display device 12, 14 to detect player interaction input at the display device 12, 14.

The game controller board 44 may also control one or more devices that produce the game output including audio and video output associated with a particular game that is presented to the user. For example, an audio board 51 may convert coded signals into analog signals for driving speakers.

The game controller board 44 may be coupled to an electronic data store storing game data for one or more interactive games. The game data may be for a primary interactive game and/or a bonus interactive game. The game data may, for example, include a set of game instructions for each of the one or more interactive games. The electronic data store may reside in a data storage device, e.g., a hard disk drive, a solid state drive, or the like. Such a data storage device may be included in EGM 10, or may reside at the host system 41. In some embodiments, the electronic data store storing game data may reside in the cloud.

The card reader 34 reads cards for player and credit information for cashless gaming. The card reader 34 may read a magnetic code on a conventional player tracking card, where the code uniquely identifies the player to a host system at the venue. The code is cross-referenced by the host system 41 to any data related to the player, and such data may affect the games offered to the player by the gaming terminal. The card reader 34 may also include an optical reader and printer for reading and printing coded barcodes and other information on a paper ticket. A card may also include credentials that enable the host system 41 to access one or more accounts associated with a user. The account may be debited based on wagers by a user and credited based on a win.

The graphics processor 54 may be configured to generate and render animation game enhancements based on game data as directed by the game controller board 44. The game enhancements may involve an interactive game environment that may provide one or more game components and graphical animation effects. The graphics processor 54 may be a specialized electronic circuit designed for image processing (including 2D and 3D image processing in some examples) in order to manipulate and transform data stored in memory to accelerate the creation of images in a frame buffer for output to the display by way of the display controller 52. The graphics processor 54 may redraw various game enhancements as they dynamically update. The graphics processor 54 may cooperate with game controller board 44 and display controller 52 to generate and render enhancements as described herein. The graphics processor 54 may generate an interactive game environment that may provide one or more game components, for example, a 3D reel space of a plurality of game components. The graphics processor 54 may generate graphical animation effects to represent a visual update to the game components in the viewing area, the visual update based on the player eye gaze data, player eye gesture data, player movement data, or any combination thereof.

The display controller 52 may require a high data transfer rate and may convert coded signals to pixel signals for the display. The display controller 52 and the audio board 51 may be directly connected to parallel ports on the game controller board 44. The electronics on the various boards may be combined onto a single board. The display controller 52 may control output to one or more display device 12, 14 (e.g. an electronic touch sensitive display device). The display controller 52 may cooperate with graphics processor 54 to render animation enhancements on the display device 12, 14.

The display controller 52 may be configured to interact with graphics processor 54 to control the display device 12, 14 to display a viewing area defining the interactive game environment including navigation to different views of the interactive game environment. Player control inputs 50 and the data capture camera device 25 may continuously detect player interaction commands to interact with interactive game environment. For example, the player may move a game component to a preferred position, select a game component, or manipulate the display of the game components.

In some embodiments, the display controller 52 may control the display device 12, 14 using the graphics processor 54 to display the viewing area that may have one or more game components. In response to the detection of the control command based on the player eye gaze data, player eye gesture data, player movement data, or any combination thereof, the display controller 52 may trigger a graphical animation effect to represent a visual update to the game components in the viewing area.

Figure 3:
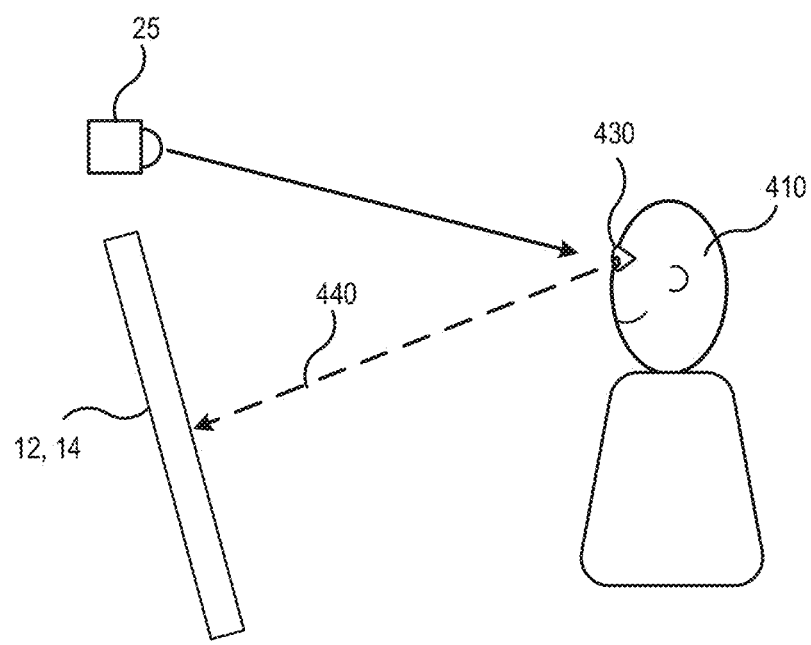
FIG. 3 is a schematic diagram illustrating the mapping of a player's eye gaze to the viewing area according to some embodiments.

Referring to FIG. 3, in some embodiments, the game controller 44 may determine the location of the eye gaze relative to the viewing area based on the position of the player's eyes relative to the EGM 10 and an angle of the player's eyes. As shown in FIG. 3, the data capture camera device 420 may monitor the position of the player's eyes 430 relative to EGM 10, and may also monitor the angle of the player's eyes 430 to collect display mapping data. The angle of the player's eyes may define the focus of the eye gaze, which may be a line of sight relative to the display device 12, 14. Based on the display mapping data, which may include the position of the player's eyes relative to the EGM 10 and an angle of the player's eyes or the line of sight relative, the game controller 44 may be configured to determine the direction and length of a virtual arrow 440 projecting from the player's eyes 430. The virtual arrow 440 may represent the eye gaze of the player 410. The game controller 44 may determine where the virtual arrow 440 intersects with the display device 12, 14. The intersection of the virtual arrow 440 and display device 12, 14 may represent where the eye gaze of the player 410 is focused on the display device 12, 14. The display device 12, 14 may be controlled by display controller 52 to display the viewing area. The game controller 44 may identify coordinates on the display device 12, 14 corresponding to the player eye gaze data and may map the coordinates to the viewing area to determine the eye gaze of the player relative to the viewing area. The EGM 10 may determine the location of the viewing area that the player 410 is looking at, which may be useful for the EGM 10 to determine how the player 410 is interacting with the interactive game. In some embodiments, the eye gaze of the player may be expressed in 2D or 3D and may be mapped to a 2D or 3D viewing area, depending on whether the interactive game is a 2D interactive game or a 3D interactive game.

Figure 4:
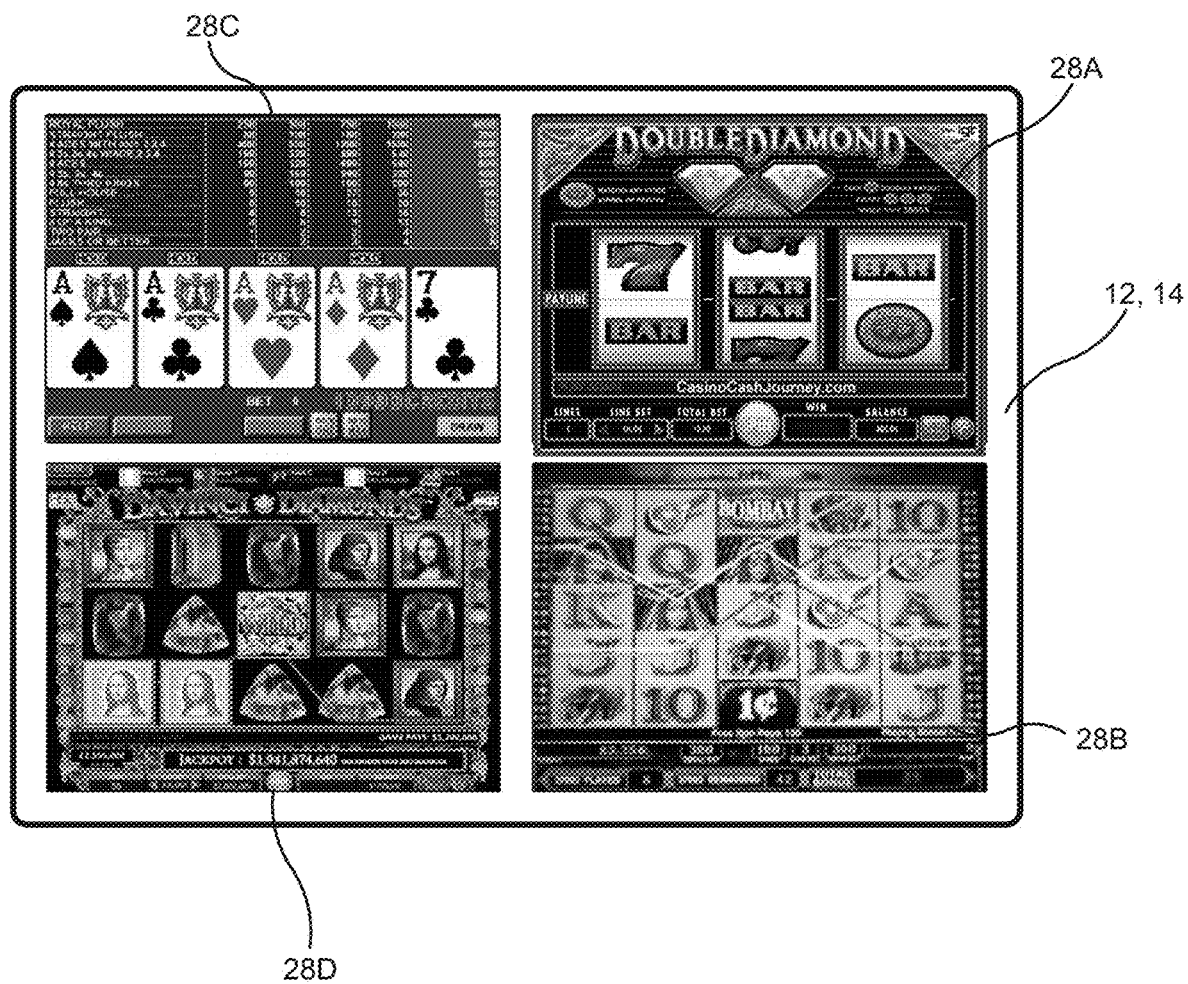
FIG. 4 is a schematic diagram illustrating a gaze-sensitive user interface that displays multiple concurrent games according to some embodiments.

FIG. 4 illustrates an example of a display device 12, 14 on which multiple concurrent games are displayed. In the example shown there, a total of four games 28A-28D are concurrently displayed on the display device 12, 14. The first and second concurrently displayed games 28A, 28B are simulated reel-type slot machine games, the third concurrently displayed game 28C is a video poker game, and the fourth concurrently displayed game 28D is a tile-matching type game. Other types of games may be displayed on the display device 12, 14. The concurrently displayed games may feature 2D and/or 3D content. Although four games are illustrated in FIG. 4, more or less than four games may be displayed concurrently on the display device 12, 14. Each of the concurrently displayed games 28A-28D may have a plurality of sounds associated with the game using the audio system of the EGM 10 in which the display device 12, 14 is provided. The sounds may be played at various stages of the game, such as at game initiation, upon the occurrence of an in-game event, in the event of a win or loss, or at other times.

As noted above, displaying multiple concurrent games on one or more display devices 12, 14 may place a significant processing burden on the EGM 10, and in particular on the game controller 44, the processor circuit 53, and/or the graphics processor 54 of the EGM 10. Moreover, playing the sounds associated with multiple concurrent games may be undesirably distracting to a player. For example, while a player may be playing multiple concurrent games on an EGM 10, the player's attention at any given time may be focused on only one of the concurrent games. In that case, the player may want to hear all of the sounds associated with the game the player is currently viewing, but may not want to hear any, or some, of the sounds associated with games the player is not currently viewing. In addition, there may be other types of audio-visual content, such as cutscene videos, that the player only wants to view from the game the player is currently viewing, while playing such content on a game that the player is not currently viewing may be needlessly distracting.

Embodiments of the present inventive concepts enable an EGM 10 to dynamically control the operation of one or more concurrently displayed games based on the viewers gaze to enhance the player's game play.

Figure 5:
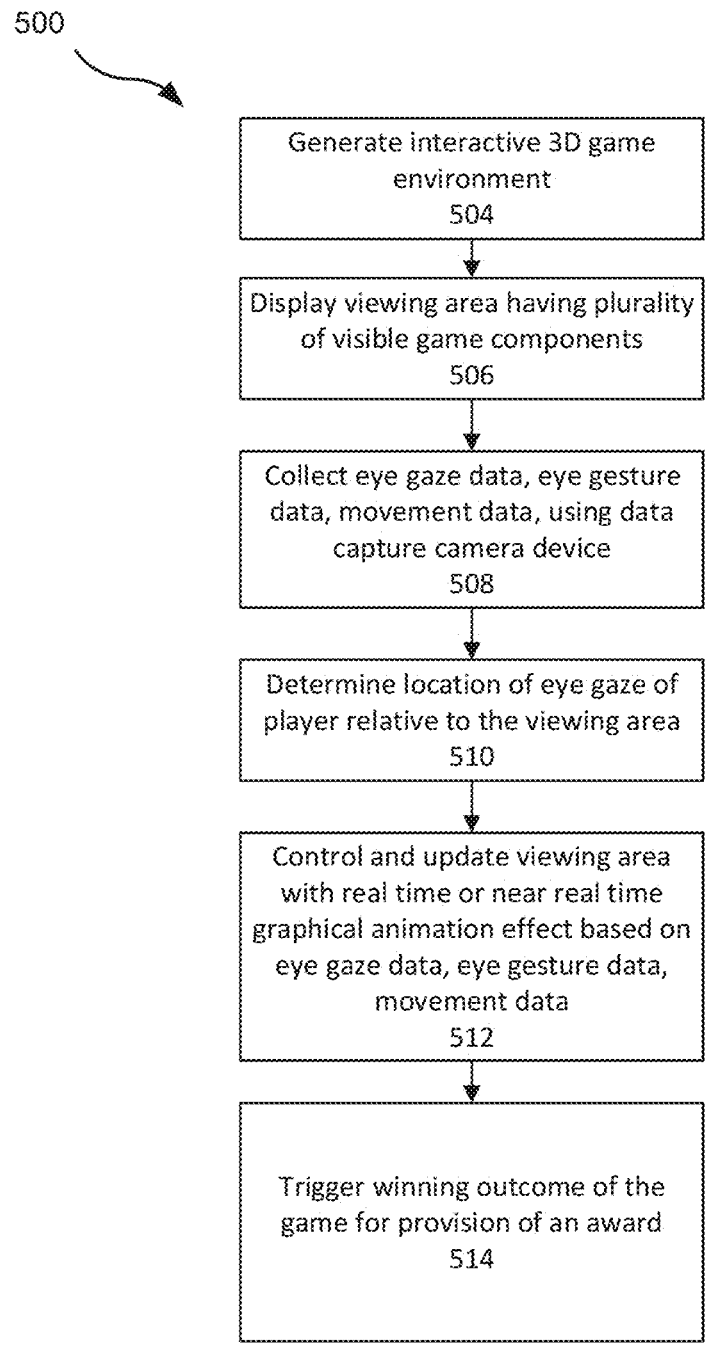
FIG. 5 is a flowchart diagram of a method implemented by an electronic gaming machine according to some embodiments.

FIG. 5 illustrates operations of an EGM 10 according to some embodiments of the inventive concepts. Referring to FIGS. 1A, 1B and 5, when a game is initiated on the EGM 10, the graphics processor 54 may generate an interactive game environment in accordance with the set of game rules using the game data for the game and define a viewing area on the display device 12, 14 for the game as a subset of the interactive game environment (block 504). The viewing area for a game may have a plurality of visible game components, such as reels, tiles, cards, etc., as illustrated for example in FIG. 4.

At block 506, the display controller 52 causes the display device 12, 14 to display viewing area having the plurality of visible game components for the game.

The data capture camera device 25 may continuously monitor the eye gaze, eye gesture, and/or movement of the player to collect player eye gaze data, player eye gesture data, and/or player movement data (block 508).

At block 510, the game controller 44 may determine a location of the eye gaze of the player relative to the viewing area as described herein using the player eye gaze data, player eye gesture data, and/or player movement data. The game controller 44 may then trigger a control command to the display controller 52 to dynamically update the rendering of the viewing area based on the player eye gaze data, player eye gesture data, and/or player movement data.

At block 512, the display controller 52 may, in response to detection of the control command, control the display device 12, 14 using the graphics processor 54 to dynamically update the rendering of the viewing area. The visual update may be based on the player eye gaze data, player eye gesture data, and/or player movement data.

At block 514, the display controller 52 may trigger a winning outcome of the game for provision of an award based on the interactions of the player and the game, which may be associated with the player eye gaze data, the player eye gesture data, and/or the player movement data.

Figure 6:
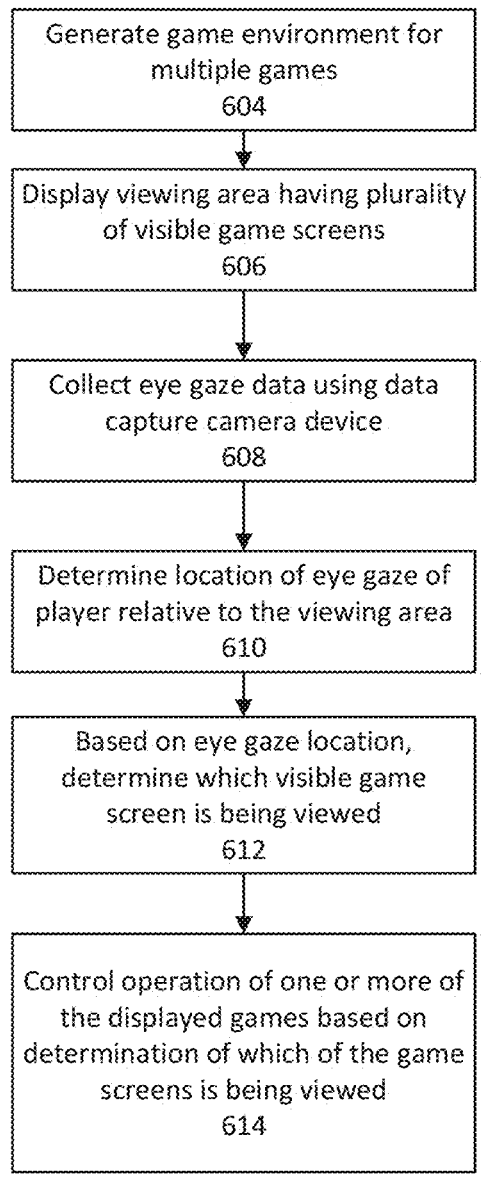
FIG. 6 is a flowchart diagram of a method implemented by an electronic gaming machine according to some further embodiments.

FIG. 6 illustrates embodiments in which a plurality of games are concurrently displayed by the EGM 10. Referring to FIGS. 1A, 1B and 6, when a plurality of games are concurrently initiated on an EGM 10, the graphics processor 54 may generate an interactive game environment in accordance with the set of game rules using the game data for each of the concurrently displayed games and define viewing areas on the display device 12, 14 for each of the games as a respective subset of the interactive game environment (block 604). The viewing area for each of the concurrently displayed games may have a plurality of visible game components, such as reels, tiles, cards, etc., as illustrated for example in FIG. 4.

At block 606, the display controller 52 may control the display device 12, 14 to display viewing areas having the plurality of visible game components for each of the concurrently displayed games.

The data capture camera device 25 may continuously monitor the eye gaze, eye gesture, and/or movement of the player to collect player eye gaze data, player eye gesture data, and/or player movement data (block 608).

At block 610, the game controller 44 may determine a location of the eye gaze of the player relative to the viewing area as described herein using the player eye gaze data, player eye gesture data, and/or player movement data.

At block 612, based on the determined location of the player's eye gaze, the game controller 44 may determine which of the concurrently displayed games is currently being viewed by the player. As explained in more detail below, the eye gaze data of the player may be filtered to reduce the effect of momentary or transient eye movements on the determination of where the player is looking.

At block 614, the game controller 44 may control an operation of one or more of the concurrently displayed games based on the determination of which game is being viewed by the player. Controlling the operation of the concurrently displayed games may include, for example, controlling a video signal and/or an audio signal of one of the concurrently displayed games based on whether or not the player is currently looking at the game.

In particular, in response to determining which one of the concurrently displayed games the player is watching, the operations may modify a manner in which the one of the concurrently displayed games is operated relative to others of the concurrently displayed games.

For example, modifying the manner in which the viewed one of the concurrently displayed games is operated relative to others of the concurrently displayed games may include allocating more processing resources to the one of the concurrently displayed games relative to others of the concurrently displayed games. This may for example include (i) assigning a higher execution priority to the viewed one of the concurrently displayed games relative to others of the concurrently displayed games; (ii) assigning more processor cores to the viewed one of the concurrently displayed games relative to others of the concurrently displayed games; (iii) increasing a video display setting of the viewed one of the concurrently displayed games relative to others of the concurrently displayed games, and/or (iv) allocating more processing resources of a graphics processor in the electronic gaming machine, such as graphics memory or graphics processor cycles, to the viewed one of the concurrently displayed games relative to others of the concurrently displayed games.

Figure 7A:
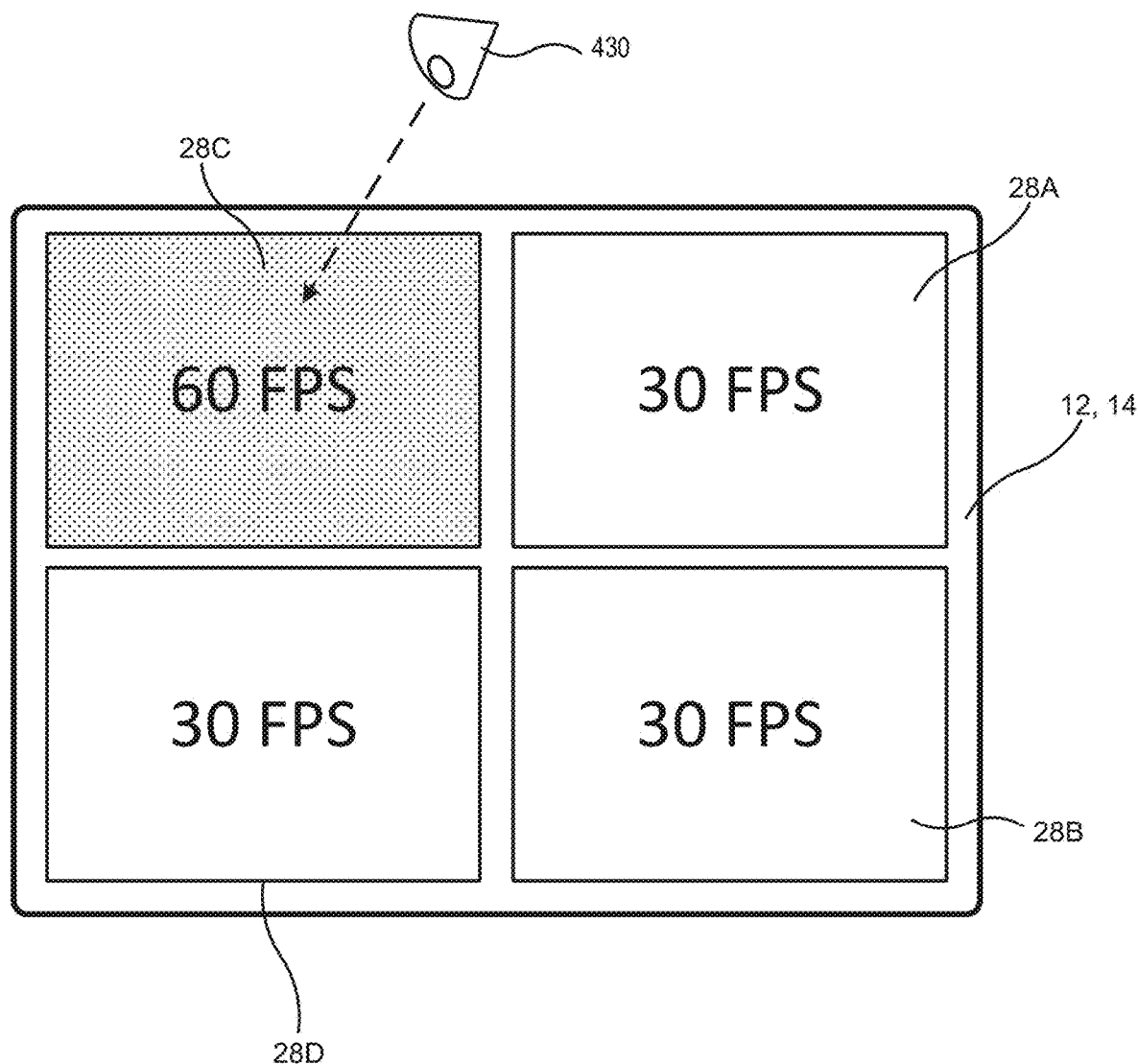
FIG. 7A illustrates changing a frame rate of one of a plurality of concurrently displayed games based on player eye gaze according to some embodiments.

When a video setting of the viewed game is increased, the video display setting may include a video resolution, an animation rate, an antialiasing setting, a shader setting, a polygon count, a mesh animation setting, an animation frequency, a shadow setting, a lighting setting, a frame rate, a bit rate, and/or a quality setting. Essentially, changing the video setting of the viewed game causes the graphics processor and/or the game processor to devote more processing resources to the viewed game. Conversely, a video setting of others of the concurrently displayed games may be decreased. Thus, for example, when a player is looking at a particular one of a group of concurrently displayed games, the EGM 10 may display the game, and in particular animations or video clips displayed as part of the game, at a higher frame rate than the other games. The frame rate of the games can be dynamically adjusted as the player's view moves from game to game. This is illustrated, for example, in FIG. 7A. As shown therein, the EGM 10 detects that the player's gaze is directed toward game 28C in the upper left corner of the display device 12, 14. In that case, the EGM 10 may set the frame rate of video displayed in game 28C to 60 frames per second (60 FPS), and set the frame rate of video displayed in games 28A, 28B and 28D to 30 frames per second. Since the user is not looking directly at the games 28A, 28B and 28D, the user may not notice the drop in video quality. Meanwhile, since the EGM 10 does not have to render games 28A, 28B and 28D at a high frame rate, more processing power can be directed to displaying video in game 28C.

Figure 7B:
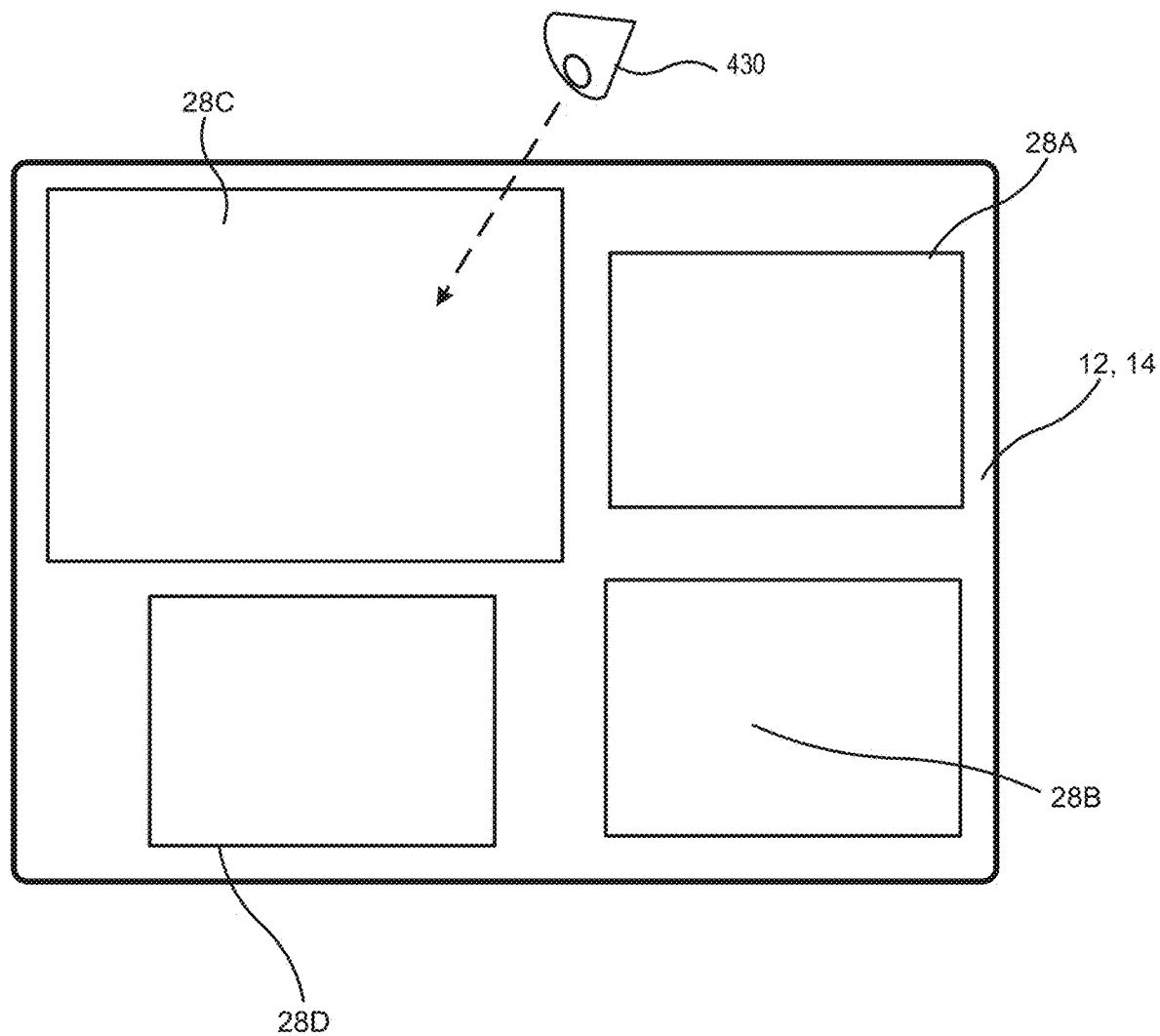
FIG. 7B illustrates changing a window size of one of a plurality of concurrently displayed games based on player eye gaze according to some embodiments.

In some embodiments, modifying the manner in which the one of the concurrently displayed games is operated relative to others of the concurrently displayed games may include changing a property of the game window on the electronic display associated with the one of the concurrently displayed games, for example, increasing a size of the game window on the electronic display associated with the one of the concurrently displayed games relative to game windows associated with others of the concurrently displayed games. In addition, the size of the game windows associated with others of the concurrently displayed games may be decreased. This is illustrated in FIG. 7B, in which the user is again looking at game 28C. In that case, the window size for game 28C is increased, while the window sizes of the games 28A, 28B and 28D is decreased.

In other embodiments, changing the property of the game window on the electronic display associated with the one of the concurrently displayed games may include increasing a color depth, color gamut, intensity, and/or contrast of images on the game window on the electronic display associated with the one of the concurrently displayed games relative to images on game windows associated with others of the concurrently displayed games. A property of the other windows may likewise be decreased.

Figure 8:
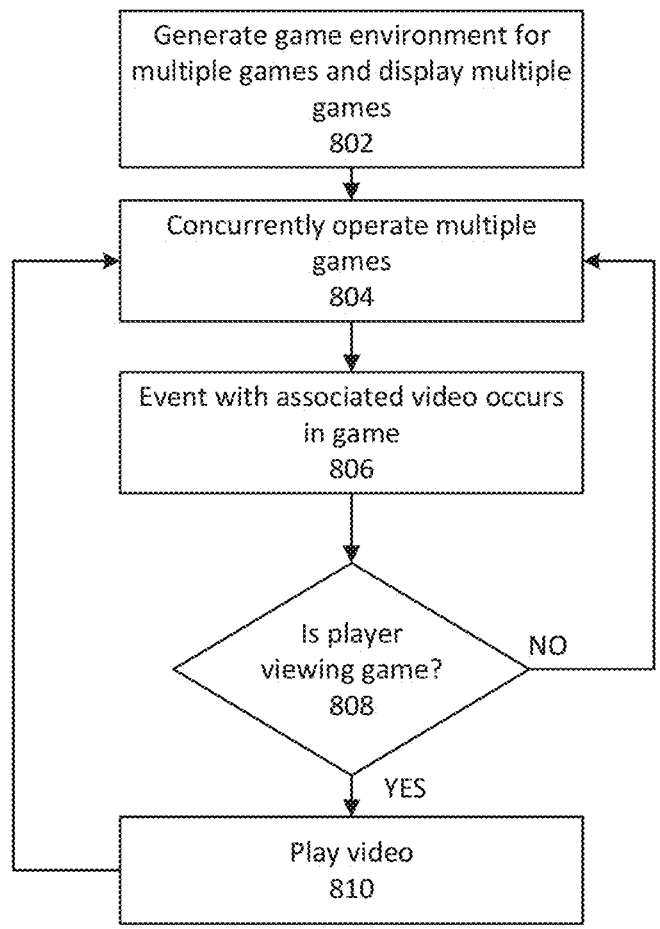
FIGS. 8-12 are flowcharts illustrating operations of electronic gaming machines according to some embodiments.

In some embodiments, movie playback may be disabled in those ones of the concurrently displayed games that are not currently being viewed by the player. For example, some games may play a cutscene video or special animation after a level is completed in the game. If the player is not currently viewing the game when a cutscene video or animation would normally be played, the EGM 10 may forego playing the cutscene video or animation. FIG. 8 illustrates operations in which videos are selectively played based on whether the player is currently looking at a game. As shown therein, in block 802, an EGM 10 generates game environments for multiple concurrent games and displays the multiple concurrent games on the display device 12, 14.

At block 804, the EGM 10 concurrently operates the multiple games.

At block 806, an event occurs in one of the concurrently operated games that is associated with a video or animation, such as a cutscene video or special animation.

At block 808, the EGM 10 determines if the player is currently looking at the game in which the event occurred. If so, the EGM plays the video at block 810 and then returns to concurrently operating the games. If not, the EGM foregoes playing the video and operations return to block 804.

In some embodiments, modifying the manner in which the one of the concurrently displayed games is operated relative to others of the concurrently displayed games may include changing an audio property of the one of the concurrently displayed games relative to audio properties of the others of the concurrently displayed games.

Changing the audio property of the one of the concurrently displayed games relative to audio properties of the concurrently displayed games may include (i) increasing a volume level of the viewed one of the concurrently displayed games relative to volume levels of the others of the concurrently displayed games, (ii) muting or reducing the volume of the others of the concurrently displayed games, and/or (iii) disabling predetermined types of sounds, such as voiceovers, in the others of the concurrently displayed games.

In some embodiments, the EGM 10 may determine whether or not to play a sound associated with a game event based on whether or not the player is looking at the game.

Figure 9:
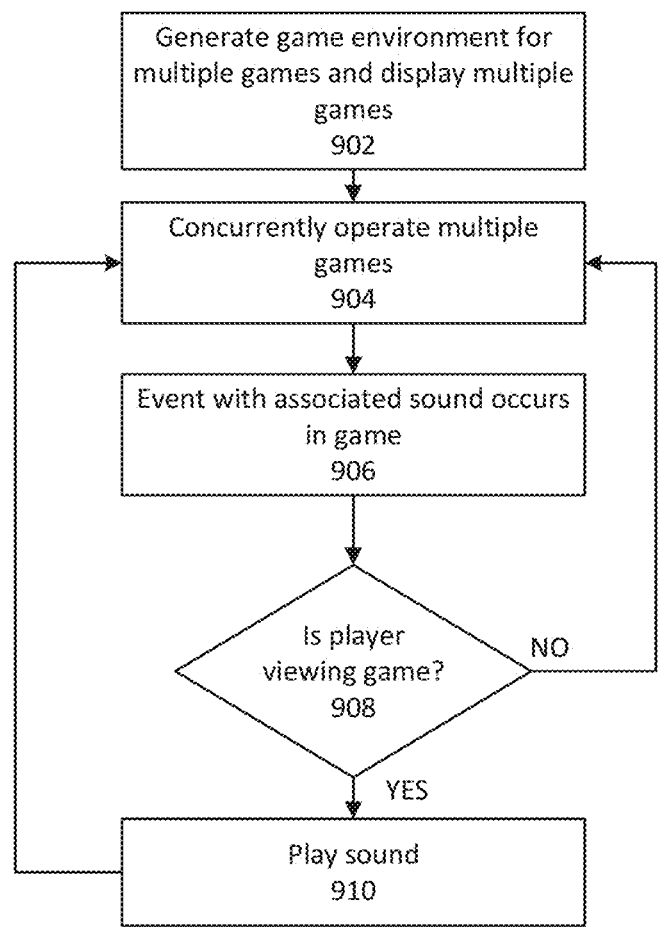

For example, FIG. 9 illustrates operations in which sounds are selectively played based on whether the player is currently looking at a game. As shown therein, in block 902, an EGM 10 generates game environments for multiple concurrent games and displays the multiple concurrent games on the display device 12, 14.

At block 904, the EGM 10 concurrently operates the multiple games.

At block 906, an event occurs in one of the concurrently operated games that is associated with a sound.

At block 908, the EGM 10 determines if the player is currently looking at the game in which the event occurred. If so, the EGM 10 plays the sound at block 910 and then returns to concurrently operating the games. If not, the EGM 10 foregoes playing the sound and operations return to block 904.

In some embodiments, priority levels may be assigned to predetermined types of sounds, and, for games other than the game that is being viewed by the player, selected ones of the predetermined types of sounds that have a priority level less than a threshold priority level may be disabled. The threshold priority level may be determined based on an audio property or state of the one of the concurrently displayed games. For example, the threshold level may be higher if an audio signal is currently being played in the viewed game.

For example, priority levels may be assigned to various types of sounds played during operation of a game as shown in Table 1 below.

TABLE 1

Sound event priority levels

| Sound Type | Priority Level |
| --- | --- |
| Background music | 0 |
| Voiceover | 1 |
| Ordinary game event | 2 |
| Special game event | 3 |
| Bonus event | 3 |
| Award event | 5 |

Note that different sound types may have the same priority level. In addition, game modes or states may have associated priority levels as shown in Table 2 below.

TABLE 2

Game state priority levels

| Sound Type | Priority Level |
| --- | --- |
| Attract mode | 1 |
| Between game mode | 2 |
| In game mode | 3 |
| Bonus round mode | 3 |
| Video display mode | 4 |

When a sound event occurs in one of the non-viewed games, the EGM 10 may determine a priority level of the sound event and a current threshold level based on the current state of the viewed game. The EGM 10 may then compare the priority level of the sound event with the current threshold level, and if the priority level of the sound event exceeds the current threshold level, may play the sound. Otherwise, the EGM 10 may forego playing the sound.

Figure 10:
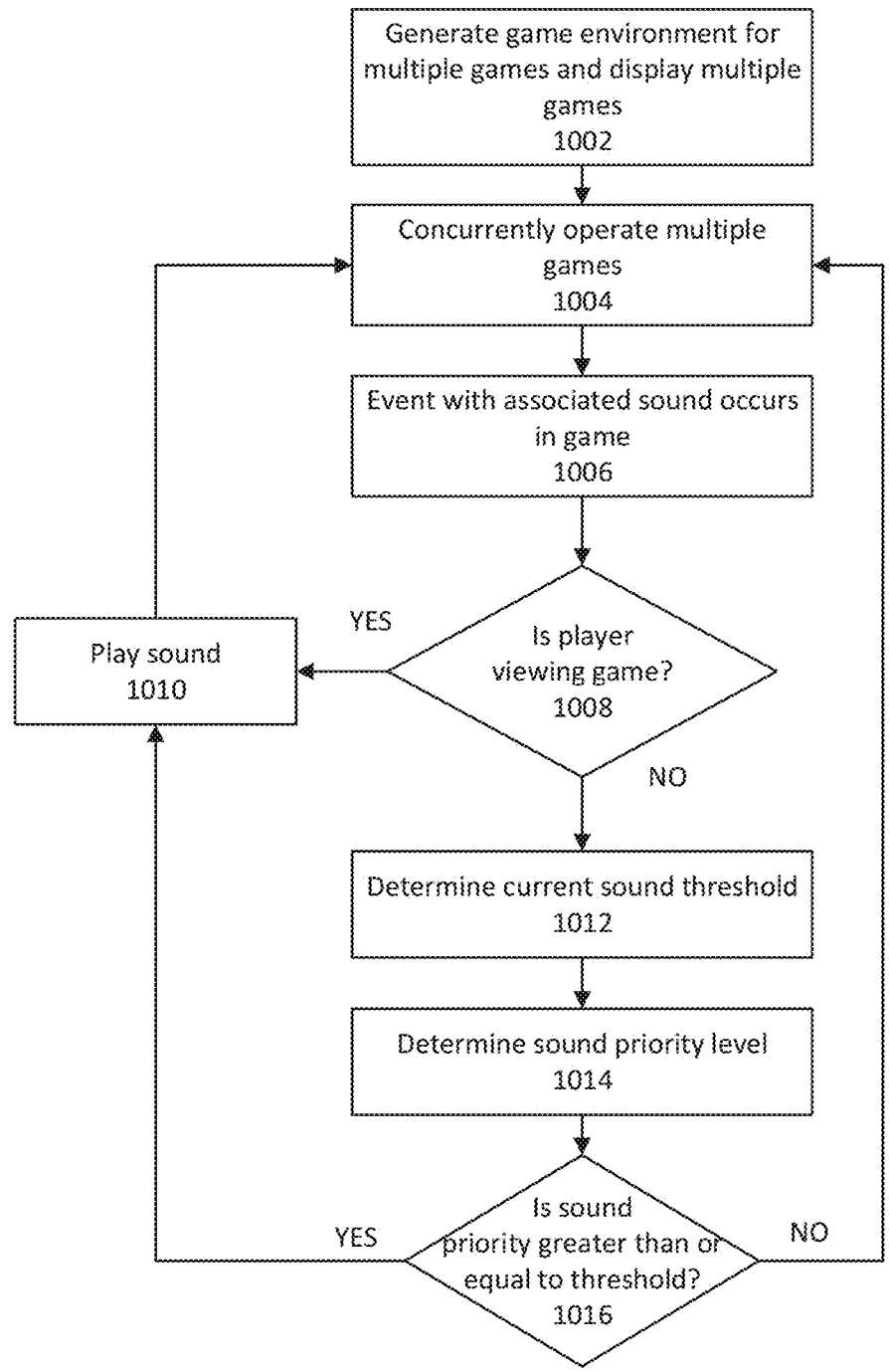

For example, FIG. 10 illustrates operations in which sounds are selectively played based on whether the player is currently looking at a game and based on a current threshold level. As shown therein, in block 1002, an EGM 10 generates game environments for multiple concurrent games and displays the multiple concurrent games on the display device 12, 14.

At block 1004, the EGM 10 concurrently operates the multiple games.

At block 1006, an event occurs in one of the concurrently operated games that is associated with a sound.

At block 1008, the EGM 10 determines if the player is currently looking at the game in which the event occurred. If so, the EGM 10 plays the sound at block 1010 and then returns to concurrently operating the games. If not, the EGM 10 determines a current sound threshold based on the state of the currently viewed game (block 1012). The sound threshold maybe determined, for example, as the higher of the priority level associated with the current game state and the priority level associated with a sound currently being played by the viewed game. For example, using the values in tables 1 and 2 above, assume that a game is currently in an "in game mode." In that case, the current threshold level is 3. However, if the game is currently playing a sound associated with an award, the current threshold may be set to 5.

The EGM 10 also determines a sound priority level associated with the sound event that was triggered in the non-viewed game (block 1014).

The EGM 10 then compares the current threshold level to the sound priority level of the sound event (block 1016). If the priority level of the sound from the non-viewed game is less than the current threshold level, the EGM 10 foregoes playing the sound and operations return to block 1004. However, if the priority level of the sound from the non-viewed game is less than or equal to the current threshold level, the EGM may play the sound at block 1010 before returning control to block 1004.

Figure 11:
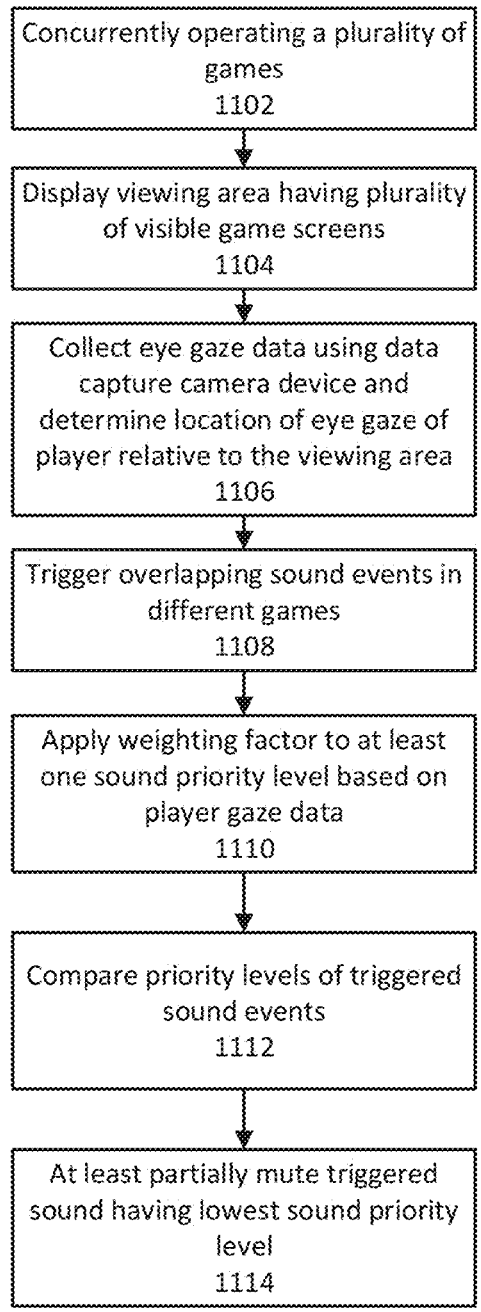

Still further embodiments are illustrated in the flowchart of FIG. 11. In the embodiments of FIG. 11, concurrently triggered sounds generated in connection with concurrently played games are compared, and the sound having the highest priority level is played. The priority level of a sound may be weighted based on whether the player is currently looking at the game that triggered the sound.

Referring to FIG. 11, operations according to some embodiments include concurrently operating a plurality of different wagering games on the electronic gaming machine (block 1102). Concurrently operating the plurality of different wagering games on the electronic gaming machine may include concurrently displaying a plurality of game windows associated with the plurality of different wagering games on an electronic display screen of the EGM 10 (block 1104).

The EGM 10 detects a gaze direction of a player and based on the detected gaze direction of the player determines which one of the concurrently displayed wagering games the player is watching (block 1106).

Each of the plurality of wagering games includes a number of sound events, and at the occurrence of a sound event, the wagering game is configured to play an associated sound. Each of the sound events may have an associated numeric ranking factor, such as the sound priority level discussed above.

Concurrent or overlapping sound events may be triggered in multiple ones of the concurrently displayed games (block 1108).

Responsive to determining which one of the concurrently displayed wagering games the player is watching, the EGM 10 may apply a weighting factor to the ranking factors of the sounds of the one of the concurrently displayed wagering games the player is watching (block 1110).

The EGM compares the sound priority levels of the two sounds (block 1112), and responsive to two sound events occurring contemporaneously in different ones of the wagering games, the sound event having a smallest numeric ranking factor may be at least partially muted (i.e., the volume may be reduced to zero or above zero) (block 1114).

In some embodiments, the EGM 10 may determine whether or not to activate a cabinet or accent lighting effect associated with a game event based on whether or not the player is looking at the game.

Figure 12:
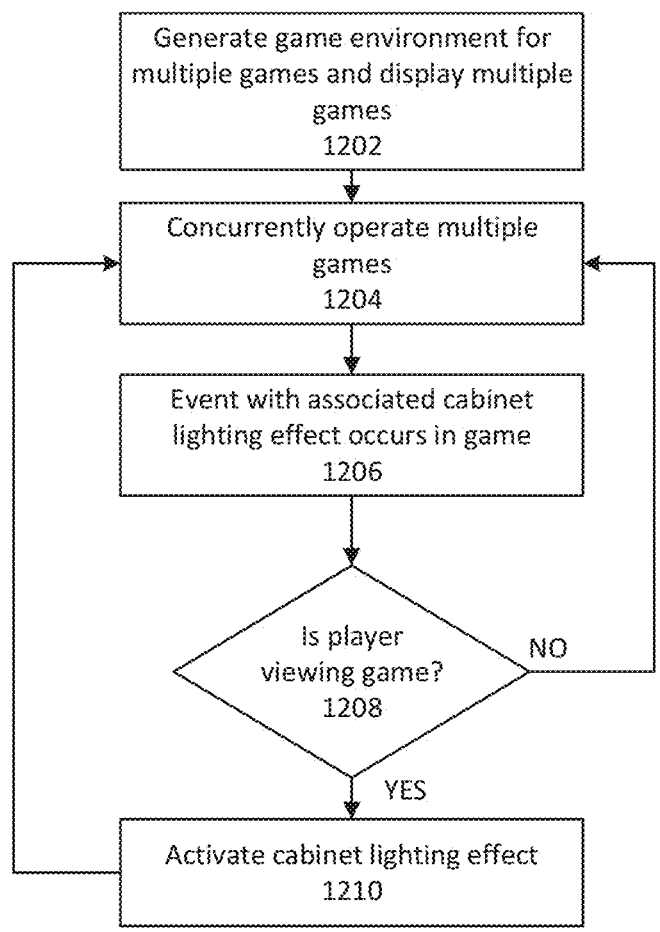

For example, FIG. 12 illustrates operations in which accent lighting effects, such as accent lighting effects using accent lights 33 shown in FIGS. 1A and 1B, are selectively activated based on whether the player is currently looking at a game. As shown therein, in block 1202, an EGM 10 generates game environments for multiple concurrent games and displays the multiple concurrent games on the display device 12, 14.

At block 1204, the EGM 10 concurrently operates the multiple games.

At block 1206, an event occurs in one of the concurrently operated games that is associated with a cabinet lighting effect.

At block 1208, the EGM 10 determines if the player is currently looking at the game in which the event occurred. If so, the EGM 10 activates the cabinet lighting effect at block 1210 and then returns to concurrently operating the games. If not, the EGM 10 foregoes playing the sound and operations return to block 1204.

Figure 13:
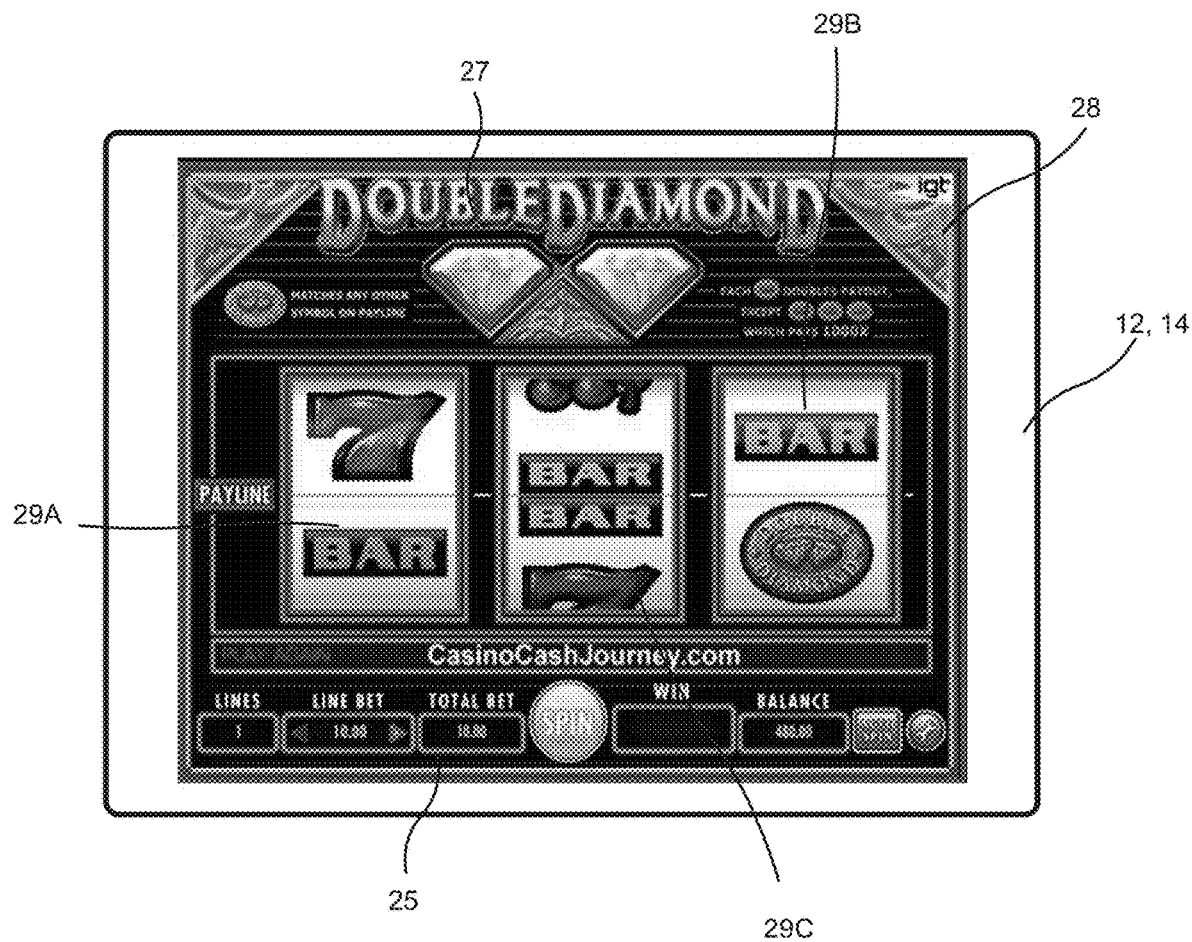
FIG. 13 is a schematic diagram illustrating a gaze-sensitive user interface that displays a game according to some embodiments.

FIG. 13 illustrates embodiments in which only a single game is displayed on the display device 12, 14, and rendering of regions of the screen is performed based on gaze detection. That is, portions of the screen the player is looking at may be rendered using more processing power relative to portions of the screen where the player is not currently looking. For example, FIG. 13 illustrates a reel-style slot machine game 28 rendered on a display device 12, 14. The screen area of the game may be divided up into multiple regions, including slot reels 29A, 29B, 29C, a header region 29 and an information bar 25 that displays information about a current game status, including number of lines bet, total amount bet, amount won and credit balance. When the EGM 10 detects that a player is looking at the slot reels 29A, 29B, 29C, the EGM 10 may change the rendering of the slot reels 29A, 29B, 29C by, for example, increasing a frame rate or amount of graphics power used to render the slot reels 29A, 29B, 29C. At the same time, the EGM 10 may change the way the other regions of the screen are rendered, such as, for example, by reducing a color depth and/or color gamut of areas of the screen that the player is not looking at.

Further Example Embodiments

In some embodiments, the data capture camera device 25 and the display device 12, 14 may be calibrated by game controller 44 and display controller 52, for example, by displaying a single image or icon, such as a target, on the screen and calling the player's attention to the target. The data capture camera device 25 then collects eye gaze data from the player as described herein. When the display device 12, 14 is a touchscreen device, the player may be prompted to touch the target on the screen. The player's gaze may be calibrated based on the direction the player was looking immediately prior to touching the screen, on the assumption that the player would look at the target immediately prior to touching it.

Figure 14:
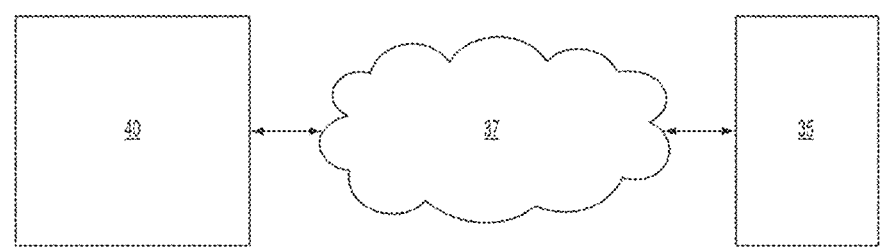
FIG. 14 is a schematic diagram of an exemplary online implementation of a computer system and online gaming system according to some embodiments.

FIG. 14 illustrates an online implementation of a gaming system that may continuously monitor the eye gaze of a player as described herein. The gaming system may be an online gaming device (which may be an example implementation of an EGM). As depicted, the gaming system includes a gaming server 40 and a gaming device 35 connected via a network 37. The eye gaze of the player may be monitored and/or predicted by the gaming device 35 such that data relating to tracked positions, trajectories, etc. may be obtained as described herein.

In some embodiments, the gaming server 40 and the gaming device 35 cooperate to implement the functionality of EGM 10, described above. So, aspects and technical features of EGM 10 may be implemented in part at the gaming device 35, and in part at the gaming server 40.

The gaming server 40 may be configured to enable online gaming, and may include game data and game logic to implement the games and enhancements disclosed herein. For example, the gaming server 40 may include a player input engine configured to process player input and respond according to game rules. The gaming server 40 may include a graphics engine configured to generate the interactive game environment as disclosed herein. In some embodiments, the gaming server 40 may provide rendering instructions and graphics data to the gaming device 35 so that graphics may be rendered at gaming device 35.

The gaming server 40 may also include a movement recognition engine that may be used to process and interpret collected player eye gaze data, player eye gesture data, and player movement data, to transform the data into data defining manipulations and player interaction commands.

The network 37 may be any network (or multiple networks) capable of carrying data including the Internet, Ethernet, POTS line, PSTN, ISDN, DSL, coaxial cable, fiber optics, satellite, mobile, wireless (e.g. WMAX), SS7 signaling network, fixed line, local area network, wide area network, and others, including any combination of these.

The gaming device 35 may be particularly configured with hardware and software to interact with the gaming server 40 via the network 37 to implement gaming functionality and render 2D or 3D enhancements, as described herein. For simplicity, only one gaming device 35 is shown but an electronic gaming system may include one or more gaming devices 35 operable by different players. The gaming device 35 may be implemented using one or more processors and one or more data stores configured with database(s) or file system(s), or using multiple devices or groups of storage devices distributed over a wide geographic area and connected via a network (which may be referred to as "cloud computing"). Aspects and technical features of the EGM 10 may be implemented using the gaming device 35.

The gaming device 35 may reside on any networked computing device, such as a personal computer, workstation, server, portable computer, mobile device, personal digital assistant, laptop, tablet, smart phone, an interactive television, video display terminals, gaming consoles, electronic reading device, and portable electronic devices or a combination of these.

The gaming device 35 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Gaming device 35 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The gaming device 35 may be operable to register and authenticate users (using a login, unique identifier, and password for example) prior to providing access to applications, a local network, network resources, other networks and network security devices. The computing device may serve one user or multiple users.

The gaming device 35 may include one or more input devices (e.g. player control inputs 50), such as a keyboard, mouse, camera, touch screen and a microphone, and may also include one or more output devices such as a display screen (with 3D capabilities) and a speaker. The gaming device 35 has a network interface in order to communicate with other components, to access and connect to network resources, to serve an application and other applications, and perform other computing applications.

The gaming device 35 connects to gaming server 40 by way of network 37 to access technical 2D and 3D enhancements to games as described herein. Multiple gaming devices 35 may connect to gaming server 40, each gaming device 35 operated by a respective player.

The gaming device 35 may be configured to connect to one or more other gaming devices through, for example, the network 37. In some embodiments, the gaming server 40 may be utilized to coordinate the the gaming devices 35. Where gaming devices 35 may be utilized to facilitate the playing of a same game, such as an interactive game, wherein the interactive game includes at interaction between activities performed by the players on the gaming devices 35, various elements of information may be communicated across the network 37 and/or the server 40. For example, the elements of information may include player eye gaze data, player eye gesture data, player movement data, and/or the viewing area displayed on the gaming device 35. This information may be used by each of the gaming devices 35 to provide and/or display interfaces that take into consideration the received data from another gaming device 35. The gaming devices 35 may be configured for cooperative and/or competitive play (or a combination thereof) between the players in relation to various game objectives, events, and/or triggers.

While playing an interactive game on the EGM 10, the eyes of a player may move suddenly without the player being conscious of the movement. The eyes of the player may demonstrate subconscious, quick, and short movements, even if the player is not actively controlling their eyes to move in this manner. These subconscious, quick, and short eye movements may affect the game controller's determination of the eye gaze of the player based on the player eye gaze data. Accurate processing of the player eye gaze data related to these subconscious, quick, and short eye movements may result in detecting the location of the eye gaze of the player representative of eye twitching or erratic eye movements not reflective of the player's intended eye gaze, and may be distracting to the player. It may be useful for the player eye gaze data to be filtered to not reflect these quick and short eye movements, for example, so the determination of the eye gaze of the player relative to the viewing area by the game controller reflects the intended eye gaze of the player. It may also be useful for the portion of the player eye gaze data representative of the subconscious, quick, and short eye movements to have less determinative effect on the determined location of the eye gaze of the player. In some embodiments, the game controller 44 may define a filter movement threshold, wherein the game controller, prior to determining a location of the eye gaze of the player relative to the viewing area using the player eye gaze data collected by the data capture camera device 25 and updating the rendering of the viewing area, determines that the player eye gaze meets the filter movement threshold. The data capture camera device 25 may collect player eye gaze data.

The game controller 44 may process the player eye gaze data to correspond with a location on the viewing area. The game controller 44 may determine where the player is looking at on the viewing area based on a certain number of previously recorded player eye gaze data, for example, by tracking the last ten eye gaze positions to average out where on the viewing area the player is looking. The game controller 44 may limit the amount of previously recorded player eye gaze data that is used to determine where on the viewing area the player is looking. The game controller 44 may filter out, or "smooth out", player eye gaze data outside of the pre-determined filter movement threshold, which may represent sudden and subconscious eye movement. The game controller 44 may map the eye gaze of the player to the viewing area using at least a portion of the filtered player eye gaze data to determine the location of the viewing area at which the player is looking, in order to map the player's eye gaze to the viewing area.

As another example, the game controller 44 may delay in processing the player eye gaze data associated with subconscious, quick, and short eye movements, so the detected location of the eye gaze of the player does not represent twitching or sudden unconscious eye movements which may trigger animation effects causing an unpleasant user experience. Large eye motions may also be associated with more delay in processing and more smoothing. In some embodiments, the game controller may partition the player eye gaze data associated with large eye motions into data representative of shorter eye motions. The game controller 44 may analyze the player eye gaze data to determine which data is associated with subconscious eye movement or with conscious eye movement based on a filter movement threshold, a time threshold, movement threshold, or any combination thereof. Player eye gaze data associated with quick eye movements over a certain period of time may be determined by the game controller 44 to be subconscious eye movement. The game controller 44 may delay in processing this portion of data so the detected location of the eye gaze of the player may be stable and may not distract the player, or the game controller may filter out this data and not process it. Player eye gaze data associated with large eye movements over a certain period of time may be determined by the game controller to be the player losing focus or being distracted. The game controller 44 may similarly delay in processing this portion of data or not process this portion of data. In some embodiments, game controller 44 may filter out, or "smooth out" player eye gaze data, player eye gesture data, player movement data, or a combination thereof, that may exceed the filter movement threshold, in the manner described herein.

The locations where the EGM 10 may be used may have a variety of lighting conditions. For example, the EGM 10 may be used in a restaurant, a hotel lobby, an airport, and a casino. It may be brighter in some locations and darker in other locations, or the light quality may fluctuate from brightness to darkness. In some embodiments, EGM 10 may include an infrared light source that illuminates the player. The infrared light sources may not interfere with the eyes of the player. In some embodiments, the data capture camera device 25 may be an infrared data capture camera device. The infrared data capture camera device may collect player eye gaze data, player eye gesture data, and player movement data without being affected by the lighting conditions of the locations where EGM 10 may be used. In some embodiments, the EGM 10 may have a plurality of light sources providing a plurality of spectra of light, and the data capture camera device 25 may be a plurality of data capture camera devices configured to detect a plurality of spectra of light, so the data capture camera device 25 may collect player eye gaze data, player eye gesture data, and player movement data without being affected by the lighting conditions of the locations where EGM 10 may be used.

A player that plays an interactive game using EGM 10 may be wearing glasses. The glasses of the player may cause refractions of the light that illuminates the player. This may affect the data capture camera device 25 while it monitors the eye gaze, eye gesture, and/or movement of the player. Glasses that comprise an infrared filter may also interfere with or affect the data capture camera device 25 while it monitors the eye gaze, eye gesture, and/or movement of the player. The EGM 10 may recognize that the player may be wearing glasses. For example, as the interactive game commences, display controller 52 may display on display device 12, 14 using graphics processor 54 a question asking the player if he or she is wearing glasses. The player may provide input indicating whether he or she is wearing glasses, such as, but not limited to, with an audio command, touch command, or with the player's eye gaze. As other example, the game controller 44 may recognize, based on processing the player eye gaze data from the data capture camera device 25, that the light illuminating the player may be refracted, and may determine that the player is wearing glasses. When EGM 10 recognizes that the player may be wearing glasses, the game controller 44 may perform additional and/or more stringent filtering functions as described herein to compromise for the player's use of glasses and to accommodate the refractions of the light that illuminates the player. For example, the filter movement threshold may be set to be higher for players who wear glasses.

In some embodiments, the game controller 44 may be configured to predict the location of the eye gaze of the player relative to the viewing area at a future time using the player eye gaze data to facilitate dynamic update to the rendering of the viewing area. For example, if the game controller 44 determines that a player is changing their gaze on a horizontal plane from the left to the right, the game controller 44 may predict that the player may look at a game component displayed on the right side of display device 12, 14. The ability for game controller 44 to predict the location of the eye gaze of the player at a future time may be useful to rule out inaccurate readings. For example, while a player plays a game, the data capture camera device 25 may incorrectly detect a button on the clothing of a player to be the player's eyes, and may collect incorrect player eye gaze data based on the button. Based on the location of the eye gaze predicted by game controller 44, the incorrect player eye gaze data may be ruled out by game controller 44, and may not be processed by game controller 44 to trigger a control command to update the viewing area with a graphical animation effect. As another example, by predicting the location of the eye gaze, the display controller 52 may adjust the resolution of the display device 12, 14 where the player is not expected to be looking. This may be useful because the EGM 10 may have limited processing power. Not all visible game components may require high resolution. Only the game components that the player is looking at may require high resolution. The ability for game controller 44 to predict the location of the eye gaze of the player may allow display controller 52 to reduce the resolution of game components that the player may not be looking at, which may increase the efficiency of the processing power of the EGM 10.

In some embodiments, the EGM 10 may apply one or more predictive techniques to develop a plurality of predicted points of eye gaze, which, for example, may approximate and/or estimate where a player's gaze will travel next. These predictions may also be provided for use by graphics processor 54 and/or game controller board 44 in relation with smoothing out and/or accounting for removal of transient readings, undesirable artefacts and/or inadvertent gaze positions. In some embodiments, the predictions may also be used to improve the performance of EGM 10 in relation to gaze capture and/or processing thereof, by, for example, applying heuristic techniques to reduce the number of computations and/or capture frequency by relying on predictions to interpolate and/or extrapolate between gaze positions captured.

For example, when a player looks at a location of a viewing area in an interactive game, the EGM 10 may record where they were looking and what events are being displayed to the player (e.g., as first movements and/or gaze positions). When an event is triggered a second time, the player's gaze movements are recorded into a data storage system, but then compared to the first movements. A comparison may include, for example, comparing positions, velocities, start and end positions, accelerations, etc. as between various gaze movements.

For example, for each duration, a path and end location may be calculated, and a predicted pathway may be developed based on these locations and stored in a data storage.

As the event is triggered more times (e.g., more iterations occur), the data may be accumulated and a predictive pathing model can be built. Once the predictive pathing model is developed, when the event is triggered, the EGM 10 could reduce the frequency of the gaze system updates and use the recorded pathing and final location to be used to reduce the overall computing resources required, for example (e.g., performing various steps of interpolation, extrapolation using the predictive pathing model).

Accordingly, predictive pathing can also be used to reduce errors being produced by the gaze system. Gaze systems may utilize cameras and edge detection to determine where the player is looking, and many utilize use infra-red light to see the player's eye. If there are other infra-red light sources, for example, such sources may cause the gaze camera to be impacted and may reduce accuracy of the gaze detection. Accordingly, predictive pathing may be useful to reduce error in similar situations where there may otherwise be recorded errors and/or aberrations.

Further, predictions may not be limited only to a current player. For example, aggregate information from a large population of players may be aggregated together to refine the model for predictive pathing. The model may, for example, take into consideration the type of player, the type of interaction the player is having with the EGM 10, the characteristics of the player (e.g., height, gender, angle of incidence), among others.

In some embodiments, the predictive pathing model may also be utilized in the context of a game. For example, if the game includes aspects which may be selectively triggered based on various inputs, an input for triggering may include predicted pathways. In some embodiments, objects and/or layers may be modified and/or altered.

In some embodiments, the player may play an interactive game with EGM 10 in communication with a mobile device. Depending on the game data of the interactive game, the player may play the interactive game on EGM 10, on the mobile device, or on both. The player may play the interactive game using their eye gaze, eye gestures, movement, the interface of the mobile device, or any combination thereof. The player may play the interactive game using only the eye gaze of the player while the player holds on to the mobile device with one or more hands. The mobile device may, for example, be a computer, personal digital assistant, laptop, tablet, smart phone, media player, electronic reading device, data communication device, or a wearable device, such as Google™ Glass, virtual reality device, or any combination thereof. The mobile device may be a custom mobile device that may be in communication with EGM 10. The mobile device may be operable by a user and may be any portable, networked (wired or wireless) computing device including a processor and memory and suitable for facilitating communication between one or more computing applications of mobile device (e.g. a computing application installed on or running on the mobile device). A mobile device may be a two-way communication device with advanced data communication capabilities having the capability to communicate with other computer systems and devices. The mobile device may include the capability for data communications and may also include the capability for voice communications, in some example embodiments. The mobile device may have at least one data capture camera device to continuously monitor the eye gaze, eye gesture, or movement of the player and collect player eye gaze data, player eye gesture data, or player movement data.

The EGM 10 may include a wireless transceiver that may communicate with the mobile device, for example using standard WiFi or Bluetooth, or other protocol based on the wireless communication capabilities of the mobile device. The player may be able to play the interactive game while the mobile device is in communication with EGM 10. When connected to the EGM 10, the viewing area may be displayed on display device 12, 14 or on the screen of the mobile device, or both. The data capture camera device 25 on the mobile device may collect player eye gaze data, player eye gesture data, or player movement data, which may be processed by a game controller 44 of EGM 10 to determine a location of the eye gaze of the player relative to the viewing area displayed on the mobile device. The game controller 44 may trigger a control command to the display controller 52 to dynamically update the rendering of the viewing area based on the player eye gaze data, player eye gesture data, or player movement data. In response to the control command from the game controller 44, the display controller 52 may control the display device 12, 14, the mobile device, or both, in real-time or near real-time using the graphics processor 54 to dynamically update the rendering of the viewing area to provide a real-time or near real-time graphical animation effect displayed on the display device 12, 14 or the mobile device representative of a visual update to the game components in the viewing area, the visual update based on the player eye gaze data, player eye gesture data, or player movement data.

In some embodiments, the mobile device in communication with EGM 10 may be configured to be a display device that compliments display device 12, 14 when playing the interactive game. The player may interact with the interactive game through the interface of the mobile device, through the EGM 10, or any combination thereof. The interactive game environment, viewing area, and game components of the interactive game may be displayed on the mobile device, display device 12, 14, or any combination thereof.

In some embodiments, a terminal may be connected to one or more EGM 10 over a network. The terminal may serve as a registration terminal for setting up the communication between the mobile device and any EGM 10 connected to the network. Therefore, the player does not have to physically go to EGM 10 to set up the link and play the interactive game associated with EGM 10.

The host system 41 may store account data for players. The EGM 10 may communicate with host system 41 to update such account data, for example, based on wins and losses. In an embodiment, host system 41 stores the aforementioned game data, and EGM 10 may retrieve such game data from host system 41 during operation.

In some embodiments, the electronics on the various boards described herein may be combined onto a single board. Similarly, in some embodiments, the electronics on the various controllers and processors described herein may be integrated. For example, the processor of game controller board 44 and graphics processor 54 may be a single integrated chip.

The EGM 10 may be configured to provide one or more player eye gaze, eye gesture, or movement interactions to one or more games playable at EGM 10. The enhancements may be to a primary interactive game, secondary interactive game, bonus interactive game, or combination thereof.

As shown, the EGM 10 may include a card reader 34 to identify a monetary amount conveyed by a player to the electronic gaming machine.

The EGM 10 may include at least one data storage device storing game data for at least one interactive game or at least one bonus interactive game, or both.

The EGM 10 may include graphics processor 54 to generate an interactive game environment and define a viewing area as a subset of the interactive game environment. The viewing area may have a plurality of game components based on the game data.

The EGM 10 may include display device 12, 14 to display via a user interface the viewing area having the plurality of game components.

The EGM 10 may include display controller 52 to control rendering of the viewing area on the display device 12, 14 using the graphics processor 54.

The EGM 10 may include at least one data capture camera device to continuously monitor eye gaze of a player to collect player eye gaze data.

The EGM 10 may include a game controller 44 for determining a location of the eye gaze of the player relative to the viewing area using the player eye gaze data and triggering a control command to the display controller 52 to dynamically update the rendering of the viewing area based on the player eye gaze data.

In response to detection of the control command, the display controller 52 controls the display device 12, 14 in real-time or near real-time using the graphics processor 54 to dynamically update the rendering of the viewing area to provide a real-time or near real-time graphical animation effect displayed on the display device 12, 14 representative of a visual update to the visible game components in the viewing area, the visual update based on the player eye gaze data.

In response to an outcome of the interactive game, the card reader 34 updates the monetary amount.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. The devices provide improved computer solutions for hardware limitations such as display screen, display device, and so on.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein may be implemented by using hardware only or by using software and a necessary universal hardware platform. Based on such understandings, the technical solution of embodiments may be in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components. Substituting the computing devices, servers, receivers, transmitters, processors, memory, display, networks particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A method of operating an electronic gaming machine, comprising:
concurrently operating a plurality of different wagering games on the electronic gaming machine, wherein concurrently operating the plurality of different wagering games on the electronic gaming machine comprises concurrently displaying a plurality of game windows associated with the plurality of different wagering games on an electronic display screen of the electronic gaming machine;
detecting a gaze direction of a player;
determining one of the concurrently displayed wagering games that the player is watching in response to the detected gaze direction of the player; and
responsive to determining which one of the concurrently displayed wagering games the player is watching, modifying a manner in which the one of the concurrently displayed wagering games is operated relative to others of the concurrently displayed wagering games,
wherein modifying the manner in which the one of the concurrently displayed wagering games is operated relative to others of the concurrently displayed wagering games comprises allocating more processing resources to the one of the concurrently displayed wagering games relative to others of the concurrently displayed wagering games by increasing a video display setting of the one of the concurrently displayed wagering games that the player is watching, and
wherein increasing the video display setting of the one of the concurrently displayed wagering games that the player is watching comprises increasing the video display setting associated with existing game elements of the wagering game.

2. The method of claim 1, wherein allocating more processing resources to the one of the concurrently displayed wagering games relative to others of the concurrently displayed wagering games comprises assigning more processor cores or processor threads to the one of the concurrently displayed wagering games relative to others of the concurrently displayed wagering games.

3. The method of claim 1, wherein the video display setting comprises a video resolution, an antialiasing setting, a shader setting, a shadow setting, a frame rate, and/or a bit rate.

4. The method of claim 1, wherein modifying the manner in which the one of the concurrently displayed wagering games is operated relative to others of the concurrently displayed wagering games comprises changing a property of the game window on the electronic display associated with the one of the concurrently displayed wagering games.

5. The method of claim 4, wherein changing the property of the game window on the electronic display associated with the one of the concurrently displayed wagering games comprises increasing a size of the game window on the electronic display associated with the one of the concurrently displayed wagering games relative to game windows associated with others of the concurrently displayed wagering games.

6. The method of claim 4, wherein changing the property of the game window on the electronic display associated with the one of the concurrently displayed wagering games comprises increasing a size of the game window on the electronic display associated with the one of the concurrently displayed wagering games and decreasing sizes of game windows associated with others of the concurrently displayed wagering games.

7. The method of claim 4, wherein changing the property of the game window on the electronic display associated with the one of the concurrently displayed wagering games comprises increasing a color depth, color gamut, intensity, and/or contrast of images on the game window on the electronic display associated with the one of the concurrently displayed wagering games relative to images on game windows associated with others of the concurrently displayed wagering games.

8. The method of claim 1, wherein allocating more processing resources to the one of the concurrently displayed wagering games relative to others of the concurrently displayed wagering games comprises allocating more resources of a graphics processor in the electronic gaming machine to the one of the concurrently displayed wagering games relative to others of the concurrently displayed wagering games.

9. The method of claim 1, wherein modifying the manner in which the one of the concurrently displayed wagering games is operated relative to others of the concurrently displayed wagering games further comprises disabling movie playback on the others of the concurrently displayed wagering games.

10. The method of claim 1, wherein modifying the manner in which the one of the concurrently displayed wagering games is operated relative to others of the concurrently displayed wagering games further comprises changing an audio property of the one of the concurrently displayed wagering games relative to audio properties of the others of the concurrently displayed wagering games.

11. The method of claim 10, wherein changing the audio property of the one of the concurrently displayed wagering games relative to audio properties of the concurrently displayed wagering games comprises increasing a volume level of the one of the concurrently displayed wagering games relative to volume levels of the others of the concurrently displayed wagering games.

12. The method of claim 11, wherein increasing the volume level of the one of the concurrently displayed wagering games relative to volume levels of others of the concurrently displayed wagering games comprises reducing volume levels of the others of the concurrently displayed wagering games.

13. The method of claim 10, wherein changing the audio property of the one of the concurrently displayed wagering games relative to audio properties of the others of the concurrently displayed wagering games comprises disabling predetermined types of sounds in the others of the concurrently displayed wagering games, the predetermined types of sound having been categorized prior to detecting the gaze direction of the player.

14. The method of claim 13, wherein the predetermined types of sounds in the others of the concurrently displayed wagering games comprise voiceovers.

15. The method of claim 13, wherein disabling predetermined types of sounds in the others of the concurrently displayed wagering games comprises assigning priority levels to the predetermined types of sounds and disabling selected ones of the predetermined types of sounds that have a priority level less than a threshold priority level.

16. The method of claim 15, wherein the threshold priority level is determined based on an audio property of the one of the concurrently displayed wagering games.

17. A method of operating an electronic gaming machine, comprising:
concurrently operating a plurality of different wagering games on the electronic gaming machine, wherein concurrently operating the plurality of different wagering games on the electronic gaming machine comprises concurrently displaying a plurality of game windows associated with the plurality of different wagering games on an electronic display screen of the electronic gaming machine;
assigning, prior to detecting a gaze direction of a player, sound priority levels for predetermined types of sounds associated with the plurality of different wagering games;
detecting the gaze direction of the player;
determining one of the concurrently displayed wagering games that the player is watching in response to the detected gaze direction of the player,
wherein each of the plurality of wagering games includes a number of sound events, upon the occurrence of which the wagering game plays an associated sound,
wherein each of the sound events has an associated sound priority level, and
wherein responsive to two sound events in different ones of the wagering games overlapping in time, the sound event having a smallest sound priority level is at least partially muted; and
responsive to determining which one of the concurrently displayed wagering games the player is watching, modifying the sound priority levels of the predetermined types of sounds of the one of the concurrently displayed wagering games the player is watching by applying a weighting factor to each the sound priority levels of the predetermined types of sounds of the one of the concurrently displayed wagering games the player is watching.

18. The method of claim 17, further comprising foregoing playing of the sound event having the smallest sound priority level.

19. A method of operating an electronic gaming machine, comprising:
concurrently operating a plurality of different wagering games on the electronic gaming machine, wherein concurrently operating the plurality of different wagering games on the electronic gaming machine comprises concurrently displaying a plurality of game windows associated with the plurality of different wagering games on an electronic display screen of the electronic gaming machine;

detecting a gaze direction of a player;

detecting occurrence of a game event in one of the plurality of wagering games, wherein the game event has an associated sound event;

determining if the player is looking at the game window associated with the one of the plurality of wagering games for which the game event occurred;

playing a sound associated with the sound event responsive to determining that the player is looking at the game window associated with the one of the plurality of wagering games for which the game event occurred; and modifying a manner in which the one of the plurality of wagering games is operated relative to others of the concurrently displayed wagering games by allocating more processing resources to the one of the concurrently displayed wagering games relative to others of the concurrently displayed wagering games comprising increasing a video display setting of the one of the concurrently displayed wagering games that the player is watching, and wherein increasing the video display setting of the one of the concurrently displayed wagering games that the player is watching comprises increasing the video display setting associated with existing game elements of the wagering game.

20. A method of operating an electronic gaming machine, comprising:

concurrently operating a plurality of different wagering games on the electronic gaming machine, wherein concurrently operating the plurality of different wagering games on the electronic gaming machine comprises concurrently displaying a plurality of game windows associated with the plurality of different wagering games on an electronic display screen of the electronic gaming machine;

detecting a gaze direction of a player;

detecting occurrence of a game event in one of the plurality of wagering games, wherein the game event has an associated lighting effect;

determining if the player is looking at the game window associated with the one of the plurality of wagering games for which the game event occurred;

activating the lighting effect responsive to determining that the player is looking at the game window associated with the one of the plurality of wagering games for which the game event occurred; and modifying a manner in which the one of the plurality of wagering games is operated relative to others of the concurrently displayed wagering games by allocating more processing resources to the one of the concurrently displayed wagering games relative to others of the concurrently displayed wagering games comprising increasing a video display setting of the one of the concurrently displayed wagering games that the player is watching, and wherein increasing the video display setting of the one of the concurrently displayed wagering games that the player is watching comprises increasing the video display setting associated with existing game elements of the wagering game.

21. A method of operating an electronic gaming machine, comprising:

operating a wagering game on the electronic gaming machine, wherein operating the wagering game on the electronic gaming machine comprises displaying a game window associated with the wagering game on an electronic display screen of the electronic gaming machine, wherein the game window has a plurality of window regions;

detecting a gaze direction of a player;

determining one of the window regions that the player is watching in response to the detected gaze direction of the player;

responsive to determining which one of the window regions the player is watching, modifying a manner in which the one of the window regions is rendered relative to others of the window regions; and modifying a manner in which the one of the plurality of wagering games is operated relative to others of the concurrently displayed wagering games by allocating more processing resources to the one of the concurrently displayed wagering games relative to others of the concurrently displayed wagering games comprising increasing a video display setting of the one of the concurrently displayed wagering games that the player is watching, and wherein increasing the video display setting of the one of the concurrently displayed wagering games that the player is watching comprises increasing the video display setting associated with existing game elements of the wagering game.

22. The method of claim 15 wherein the predetermined types of sounds in the others of the concurrently displayed wagering games comprises background music, voiceovers, ordinary game event, special game event, bonus event, and award event sounds.

23. The method of claim 17 further comprises:

responsive to applying a weighting factor to the sound priority levels of the predetermined types of sounds, disabling selected ones of the predetermined types of sounds that have a priority level less than a threshold priority level.

* * * * *